United States Patent
Kossoy et al.

(10) Patent No.: US 11,634,341 B2
(45) Date of Patent: Apr. 25, 2023

(54) NANOLOG AND NANOPARTICLES AND METHOD OF FORMATION

(71) Applicant: NANOTECH INDUSTRIAL SOLUTIONS, INC., Avenel, NJ (US)

(72) Inventors: Anna Kossoy, Rehovot (IL); Vladimir Aguf, Rehovot (IL); Alexander Margolin, Nes Ziona (IL)

(73) Assignee: NANOTECH INDUSTRIAL SOLUTIONS, Avenel, NJ (US)

( * ) Notice: Subject to any disclaimer, the term of this patent is extended or adjusted under 35 U.S.C. 154(b) by 6 days.

(21) Appl. No.: 16/928,543

(22) Filed: Jul. 14, 2020

(65) Prior Publication Data
US 2021/0002144 A1   Jan. 7, 2021

Related U.S. Application Data

(63) Continuation of application No. 16/075,286, filed as application No. PCT/US2017/016408 on Feb. 3, 2017, now Pat. No. 10,710,895.
(Continued)

(51) Int. Cl.
*B01J 23/30* (2006.01)
*C01G 41/00* (2006.01)
(Continued)

(52) U.S. Cl.
CPC .............. *C01G 41/00* (2013.01); *B01J 23/30* (2013.01); *B01J 27/047* (2013.01); *B01J 35/002* (2013.01);
(Continued)

(58) Field of Classification Search
None
See application file for complete search history.

(56) References Cited

U.S. PATENT DOCUMENTS

| 5,958,358 A * | 9/1999 | Tenne ................. C30B 25/02 117/921 |
| 2004/0256601 A1* | 12/2004 | Hubacek ............. C09C 3/063 252/500 |

(Continued)

FOREIGN PATENT DOCUMENTS

| EP | 2514524 A1 | 10/2012 |
| WO | 0066485 | * 11/2000 |

(Continued)

OTHER PUBLICATIONS

Wang G.X. et al.,"Tungsten disulfide nanotubes for lithium storage" Electrochemical and Solid-State Letters (Sep. 2004) pp. A321-A323, vol. 7, No. 10.
(Continued)

*Primary Examiner* — Sheng H Davis
(74) *Attorney, Agent, or Firm* — Harry Hild

(57) ABSTRACT

A nanostructure is provided that in one embodiment includes a cluster of cylindrical bodies. Each of the cylindrical bodies in the cluster are substantially aligned with one another so that their lengths are substantially parallel. The composition of the cylindrical bodies include tungsten (W) and sulfur (S), and each of the cylindrical bodies has a geometry with at least one dimension that is in the nanoscale. Each cluster of cylindrical bodies may have a width dimension ranging from 0.2 microns to 5.0 microns, and a length greater than 5.0 microns. In some embodiments, the cylindrical bodies are composed of tungsten disulfide ($WS_2$). In another embodiment the nanolog is a particle comprised of external concentric disulfide layers which encloses internal disulfide folds and regions of oxide. Proportions between disulfide and oxide can be tailored by thermal treatment and/or extent of initial synthesis reaction.

12 Claims, 18 Drawing Sheets

Related U.S. Application Data

(60) Provisional application No. 62/291,229, filed on Feb. 4, 2016.

(51) Int. Cl.

| | | |
|---|---|---|
| *B01J 37/20* | (2006.01) | |
| *B01J 35/02* | (2006.01) | |
| *C01G 41/02* | (2006.01) | |
| *C04B 28/04* | (2006.01) | |
| *H01M 4/58* | (2010.01) | |
| *C04B 14/36* | (2006.01) | |
| *B01J 37/08* | (2006.01) | |
| *B01J 35/00* | (2006.01) | |
| *B01J 27/047* | (2006.01) | |
| *B01J 37/02* | (2006.01) | |
| *C08K 3/30* | (2006.01) | |
| *C08L 23/06* | (2006.01) | |
| *C08L 77/02* | (2006.01) | |
| *C08L 79/08* | (2006.01) | |
| *B82Y 30/00* | (2011.01) | |
| *H01M 10/0525* | (2010.01) | |
| *B82B 3/00* | (2006.01) | |
| *B82Y 40/00* | (2011.01) | |

(52) U.S. Cl.
CPC ......... *B01J 35/0013* (2013.01); *B01J 35/023* (2013.01); *B01J 35/026* (2013.01); *B01J 37/0215* (2013.01); *B01J 37/08* (2013.01); *B01J 37/20* (2013.01); *C01G 41/02* (2013.01); *C04B 14/36* (2013.01); *C04B 28/04* (2013.01); *C08K 3/30* (2013.01); *C08L 23/06* (2013.01); *C08L 77/02* (2013.01); *C08L 79/08* (2013.01); *H01M 4/5815* (2013.01); *B01J 2523/69* (2013.01); *B82B 3/0052* (2013.01); *B82Y 30/00* (2013.01); *B82Y 40/00* (2013.01); *C01P 2002/72* (2013.01); *C01P 2004/03* (2013.01); *C01P 2004/04* (2013.01); *C01P 2004/12* (2013.01); *C01P 2004/16* (2013.01); *C01P 2004/50* (2013.01); *C01P 2004/61* (2013.01); *C01P 2004/90* (2013.01); *C08K 2003/3009* (2013.01); *C08K 2201/003* (2013.01); *C08K 2201/004* (2013.01); *H01M 10/0525* (2013.01)

(56) References Cited

U.S. PATENT DOCUMENTS

2014/0231148 A1 8/2014 Kverel et al.
2017/0341935 A1* 11/2017 Huang ................ H01M 4/483

FOREIGN PATENT DOCUMENTS

| WO | 2000066485 A1 | 11/2000 |
| WO | 2001066462 A2 | 9/2001 |

OTHER PUBLICATIONS

International Search Report issued in International Application No. PCT/US2017/016408, dated June 8, 2017, pp. 1-2.

* cited by examiner

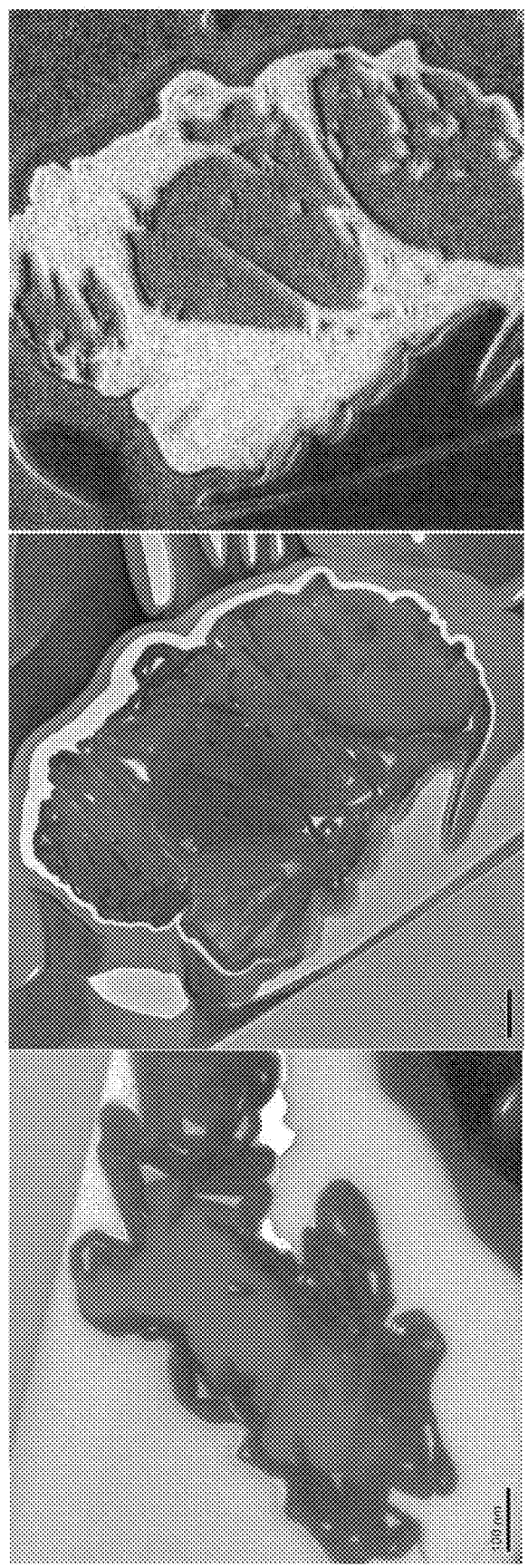

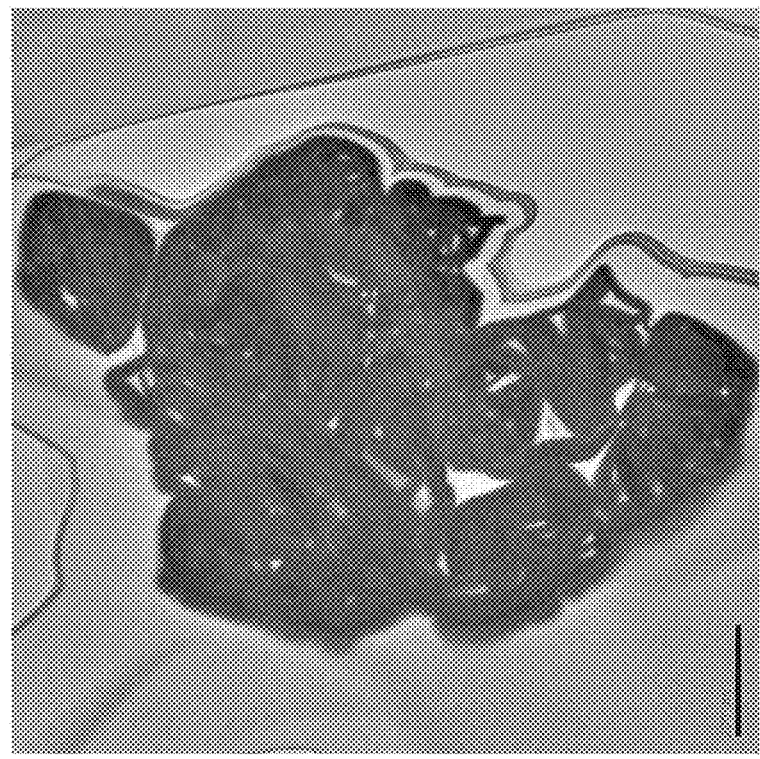
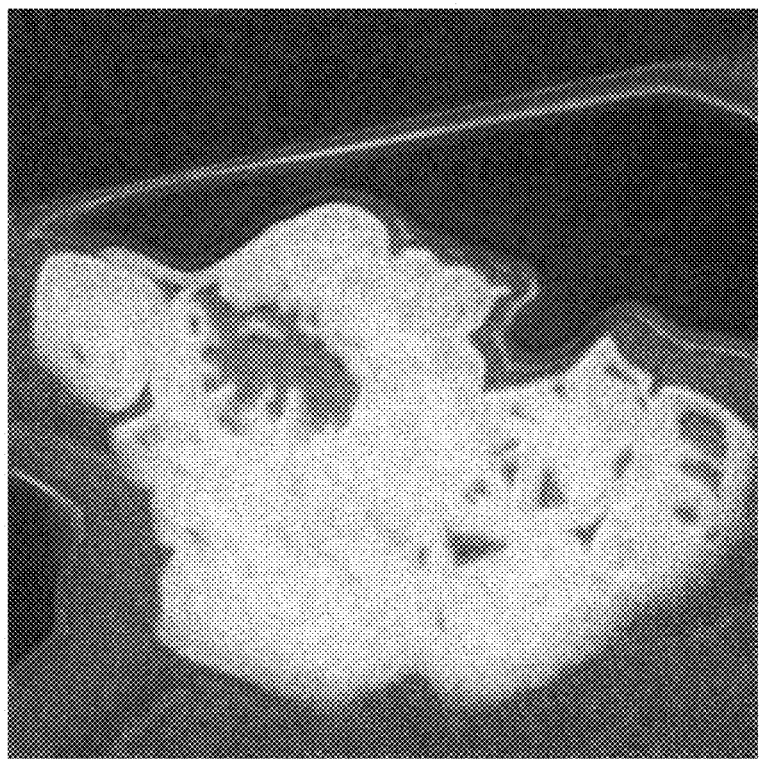

NANOLOG AND NANOPARTICLES AND METHOD OF FORMATION

CROSS REFERENCE TO RELATED APPLICATION

The present invention claims the benefit of U.S. application Ser. No. 16/075,286 filed on Aug. 3, 2018 the whole contents and disclosure of which is incorporated by reference as is fully set forth herein. The U.S. application Ser. No. 16/075,286 was an application filed under the provisions of 35 U.S.C. 371 (a "371 application") of international application No. PCT/US17/16408 (an "international application") filed on Feb. 3, 2017. The international application claimed priority of U.S. Provisional Application No. 62/291,229 filed on Feb. 4, 2016.

FIELD OF THE INVENTION

The present disclosure relates to nanolog geometry like particles

SUMMARY OF THE INVENTION

In one embodiment of the present disclosure, a nanostructure is provided that includes a cluster of cylindrical bodies. Each of the cylindrical bodies in the cluster is substantially aligned with one another so that their lengths are substantially parallel. The composition of the cylindrical bodies comprises tungsten (W) and sulfur (S), and each of the cylindrical bodies has a geometry with at least one dimension that is in the nanoscale. Each cluster of cylindrical bodies may have a width dimension ranging from 0.3 microns to 5.0 microns (in some examples ranging from 0.3 microns to 3.0 microns) and a length greater than 5.0 microns. In some embodiments, the cylindrical bodies are composed of tungsten disulfide ($WS_2$).

In some embodiments, each of the cylindrical bodies has a hollow core across their entire length. In some examples, an oxide layer can be present between the tungsten and sulfur containing body and the hollow core. In another embodiment, the cylindrical body has a solid core in at least one portion of the cylindrical body along its length. The solid core can be composed of an oxide containing composition. In some examples, the solid core may extend along an entire length of the cylindrical body. In other embodiments, the cylindrical bodies can include a hollow core that alternates with a solid oxide core along the length of the cylindrical body.

In some embodiments, each cluster of cylindrical bodies contains between 2 and 200 cylindrical bodies. In some examples, each of the cylindrical bodies has a width dimension ranging from 10 nm to 100 nm, and each of the cylindrical bodies may have a length greater than 5 microns. In some embodiments, each cluster of cylindrical bodies has a width ranging from 0.2 microns to 1 micron, and a length ranging from 5 microns to 100 microns.

In another embodiment, a nanostructure is provided that includes a cluster of cylindrical bodies, in which each cylindrical body has a hollow core. Each of the cylindrical bodies in the cluster is substantially aligned with one another so that their lengths are substantially parallel. The composition of the cylindrical bodies comprise tungsten (W) and sulfur (S), and each of the cylindrical bodies has a geometry with at least one dimension that is in the nanoscale. Each cluster of cylindrical bodies may have a width dimension ranging from 0.2 microns to 2.0 microns, and a length greater than 5.0 microns. In some embodiments, the cylindrical bodies are composed of tungsten disulfide ($WS_2$).

In some embodiments, each cluster of cylindrical bodies having the hollow core contains between 2 and 200 cylindrical bodies. In some examples, each of the cylindrical bodies has a width dimension ranging from 10 nm to 100 nm, and each of the cylindrical bodies may have a length greater than 5 microns. In some embodiments, each of said cluster of cylindrical bodies has a width ranging from 0.2 microns to 1 micron, and a length ranging from 5 microns to 100 microns.

In another embodiment, a nanostructure provided consists of outer shell of closed or partly closed crystalline $WS_2$ layers and interior of crystalline folds of $WS_2$ and with crystalline regions of $WO_{3-x}$ ($0<x<0.3$). Proportions between sulfide and oxide regions could vary between particles and depending on preparation conditions such as duration of initial synthesis and subsequent annealing if applied.

In another aspect of the present disclosure, a method is provided for forming a cluster of cylindrical bodies each having a nanoscale. The method may begin with reduction of a particle size of tungsten oxide powder to produce a precursor material having a reduced particle size. The precursor material is then heated to a reaction temperature in an inert atmosphere. Once the reaction temperature is reached, the atmosphere is exchanged to contain hydrogen sulfide to provide reduction and sulfidization reactions with the precursor material. Following reaction and sulfidization of the precursor material at the reaction temperature, the reactant structure is cooled and separated into a powder containing clusters of cylindrical bodies. The clusters of cylindrical bodies being composed of tungsten (W) and sulfur (S), wherein each of the cylindrical bodies has a geometry with at least one dimension that is in the nanoscale. Each cluster of cylindrical bodies may have a width dimension ranging from 0.2 microns to 5.0 microns (in some examples a width ranging from 0.3 to 2.0 microns), and a length greater than 5.0 microns.

In one embodiment, reducing the particle size comprises grinding coarse $WO_3$ to fine size so that 50% of the powder will be below 1 μm. In another embodiment no grinding is necessary if the powder is fine enough.

In some embodiments, heating the precursor material to the reaction temperature includes increases a temperature of the chamber from ambient to a reaction temperature ranging from 750° C. to 950° C. while streaming a nitrogen gas ($N_2$) atmosphere through the chamber at substantially atmospheric pressure, e.g., slightly higher than atmospheric pressure.

In some embodiments, the step of introducing hydrogen sulfide containing gas into the chamber after the reaction temperature has been reached comprises exchanging the nitrogen gas atmosphere with an atmosphere comprising 30% to 50% hydrogen sulfide ($H_2S$) gas, and 30% to 50% hydrogen ($H_2$) gas. In one example, the hydrogen sulfide containing gas into the chamber comprises a mixture of $N_2/H_2/H_2S$ with ratio 1:2:2. The hydrogen sulfide containing gas may be reacted with the precursor material for at least one hour.

In some embodiments, the time period for introducing hydrogen sulfide containing gas to react with the precursor material is selected to provide an oxide core within the cylindrical bodies, or to provide a hollow core within the cylindrical bodies. Typically, as the time of the anneal is increased, the amount of oxide at the core decreases. The time period for producing the hollow core is greater than a time period for creating the solid core. In one example, the time period for producing the solid core is greater than 1 hour and less than 6 hours. The time for producing the hollow core is typically greater than 5 hours. In one embodiment, the time period for producing the hollow core ranges from 6 hours to 10 hours. In some embodiments, despite the amount of oxide decreasing with increasing anneal time, a portion of the oxide can still remain at the core of the structure.

In some embodiments, after producing the sulfided reactant structure, the method further comprises flowing nitrogen gas ($N_2$) through the chamber to end the reduction and sulfidization reactions.

In another embodiment, a composition is provided that may be employed as a building material. For example, the composition may be employed in Portland type cement applications. In some embodiments, the composition may include a matrix composition comprising at least one of calcium oxide, silicon oxide and aluminum oxide; and a dispersed phase composition comprising clusters of substantially cylindrical bodies comprising tungsten (W) and sulfur (S). Each of the cylindrical bodies may have a geometry with at least one dimension that is in the nanoscale, wherein each cluster of cylindrical bodies has a width dimension ranging from 0.2 microns to 5.0 microns (in some examples 0.2 microns to 3.0 microns), and a length greater than 5.0 microns.

In some embodiments, the dispersed phase composition is present in the matrix composition in an amount ranging from 0.1 wt. % to 5 wt. %. In one example, the dispersed phase composition is present in the matrix composition in an amount ranging from 0.15 wt. % to 0.5 wt. %.

In some embodiments, the cylindrical bodies are composed of tungsten disulfide ($WS_2$). The cylindrical body may have a hollow core across its entire length or the cylindrical body may have a solid core in at least one portion of the cylindrical body along its length. The solid core can be comprised of an oxide containing composition. Each of the clusters can contain between 2 and 200 cylindrical bodies, wherein each of said cylindrical body can have a width dimension ranging from 10 nm to 100 nm. In some embodiments, each of the clusters of cylindrical bodies employed in the dispersed phase of the composition has a width ranging from 0.2 microns to 2 microns, and can have a length ranging from 8 microns to 100 microns.

In another aspect of the present disclosure, a polymer composite is provided including a dispersed phase material of clusters of substantially cylindrical bodies comprising tungsten (W) and sulfur (S) that is present in a polymer matrix. Each of the cylindrical bodies in the clusters of the dispersed phase material have a geometry with at least one dimension that is in the nanoscale. Each cluster of cylindrical bodies has a width dimension ranging from 0.3 microns to 5.0 microns (in some examples ranging from 0.3 microns to 3.0 microns), and a length greater than 5.0 microns. The polymer matrix has a composition selected from the group consisting of elastomers, epoxies, thermoplastic polymers, polyamides, polyphthalamide, polyphthalamide blend, polyamide-imide, polyethylene, cross-linked polyethylene, polyester, polyurethanes, polyproplenes, and combinations thereof. The dispersed phase material is present in the matrix composition in an amount ranging from 0.1 wt. % to 5 wt. %. In one embodiment, the cylindrical bodies are composed of tungsten disulfide ($WS_2$). Each cluster can contain between 10 and 200 cylindrical bodies, which may each have a width ranging from 1 nm to 100 nm. In some embodiments, the cylindrical bodies have at least one of a hollow core across its entire length, or a solid core in at least one portion of the cylindrical body along its length. The solid core may be comprised of an oxide containing composition.

In another aspect, the above described composite polymer may be part of an ink used for 3D printing, and other additive forming methods.

In another aspect, a method of forming substantially spherical nanoparticles of tungsten oxide ($WO_{2.9}$) is provided. In some embodiments, the method may include reducing a particle size of $WO_3$ powder to produce a $WO_3$ precursor material having a reduced particle size. In a following step, the precursor material is heated in a chamber to a reaction temperature ranging from 400° C. to 700° C. in an inert atmosphere. A reaction atmosphere may then be introduced to the chamber containing the precursor material. The reaction atmosphere may include 5% to 45% hydrogen gas and 55% to 95% nitrogen gas. The reaction time is typically less than 1 hour. The application of the reaction atmosphere to the $WO_3$ precursor material converts the precursor material to a reaction product of $WO_{2.9}$. In some embodiments, the reaction product of $WO_{2.9}$ is mechanically separated into a powder containing nanospheres composed of $WO_{2.9}$.

In one embodiment of the present disclosure, a nanostructure is provided that includes a cluster of cylindrical bodies having a core of crystalline nanodomains. Each of the cylindrical bodies in the cluster is substantially aligned with one another so that their lengths are substantially parallel. The composition of the cylindrical bodies comprises tungsten (W) and sulfur (S), and each of the cylindrical bodies has a geometry with at least one dimension that is in the nanoscale. Each cluster of cylindrical bodies may have a width dimension ranging from 0.2 microns to 5.0 microns (in some examples ranging from 0.3 microns to 3.0 microns), and a length greater than 5.0 microns. In some embodiments, the cylindrical bodies are composed of tungsten disulfide ($WS_2$).

In yet another aspect, the present disclosure provides a method of forming a catalyst is provided. For example, the catalyst formed herein may be used in hydrodesulfurization processes. In one embodiment, the method of forming the catalyst may include treating a precursor material of tungsten oxide powder with a hydrogen sulfide containing gas to provide reduction and sulfidization reactions with the precursor material to provide a sulfided reactant structure; and separating the sulfided reactant reaction into a powder containing clusters of cylindrical bodies composed of tungsten (W) and sulfur (S). Each of the cylindrical bodies has a geometry with at least one dimension that is in the nanoscale, and each cluster of cylindrical bodies may have a width dimension ranging from 0.2 microns to 5.0 microns (in some examples the width of the cluster of cylindrical bodies ranges from 0.3 microns to 3.0 microns), and a length greater than 5.0 microns. In some examples, the width dimension for each cluster of cylindrical bodies, i.e., each nanolog, ranges from 0.3 microns to 3 microns. Forming the catalyst material may continue with forming a metal containing coating on the clusters of cylindrical bodies.

In some embodiments, forming the metal containing coating includes surface activation of the clusters of cylindrical bodies, and plating the metal containing coating on the cylindrical bodies. In one example, surface activation includes the formation of palladium (Pd) nanocrystals on the cylindrical with a method comprising immersing said clusters of said cylindrical bodies in a first aqueous solution of $SnCl_2.2H_2O$ and HCl to provide treated cylindrical bodies, removing the treated cylindrical bodies from the first aqueous solution, and immersing the treated cylindrical bodies with a second aqueous solution of Pd/Cl$_2$ and HCl to create said (Pd) nanocrystals.

In some embodiments, the metal containing coating that is applied in to form the catalyst material includes nickel (Ni), cobalt (Co) or a combination thereof. Electroplating a cobalt (Co) containing coating on the surface of the cylindrical bodies including (Pd) nanocrystals may include immersing the cylindrical bodies in a solution containing cobalt chloride and sodium citrate, and introducing dimethylamine borane (DMAB) and/or sodium hyposphite to provide a reduction reaction to plate cobalt onto the surface of the cylindrical bodies.

In some embodiments, the metal containing coating that is applied in to form the catalyst material includes nickel (Ni), cobalt (Co) or a combination thereof. Electroplating a cobalt (Co) containing coating on the surface of the cylindrical bodies including (Pd) nanocrystals may include immersing the cylindrical bodies in a solution containing cobalt chloride and sodium citrate, and introducing dimethylamine borane (DMAB) and/or sodium hyposphite to provide a reduction reaction to plate cobalt onto the surface of the cylindrical bodies. Electroplating a nickel (Ni) containing coating on the surface of the cylindrical bodies that includes the (Pd) nanocrystals may include immersing the cylindrical bodies in a solution containing nickel sulfate or nickel chloride, and applying a reducing agent of sodium hypophosphite.

Another embodiment is use of nanologs in anode or cathode of lithium (Li) batteries.

BRIEF DESCRIPTION OF THE DRAWINGS

The following detailed description, given by way of example and not intended to limit the disclosure solely thereto, will best be appreciated in conjunction with the accompanying drawings, wherein like reference numerals denote like elements and parts, in which:

FIGS. 21A, 21B and 21C are cross-sectional view of two as-prepared nanologs consistent with the structures depicted in FIGS. 20A and 20B. FIGS. 21A and 21B represent high resolution TEM images of cross-sections obtained from the middle part of nanologs from two different batches. FIG. 21C is an electron energy loss spectroscopy (EELS) image of the cross-section depicted in FIG. 21B.

FIGS. 22A and 22B are cross-sectional view of annealed nanologs. FIG. 22A represents High Resolution TEM images of cross-section obtained from the middle part of nanologs after annealing. FIG. 22B is an EELS image of the cross-section in FIG. 22A.

FIG. 24 is an illustration of a fold geometry that is consistent with the types of geometries used in the

DETAILED DESCRIPTION

Figure 1:
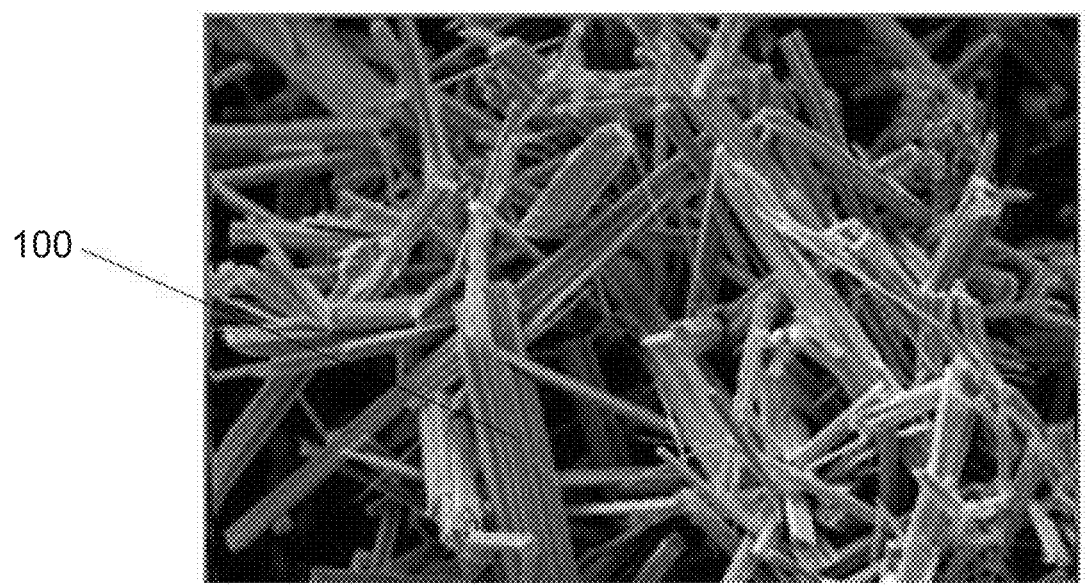
FIG. 1 is a scanning electron microscope (SEM) image of clusters of cylindrical bodies (also referred to as nanologs) composed of tungsten (W) and sulfur (S) formed from a precursor composed of WO$_3$, in which each of the cylindrical bodies has a geometry with at least one dimension that is in the nanoscale, in accordance with one embodiment of the present disclosure.

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. When a numerical range is provided, the range includes each value within the range, as well as the end points of the range. The terms "positioned on" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

Referring to FIGS. 1-11, the present disclosure provides tungsten disulfide ($WS_2$) nano-particles with high aspect ratios that can include a solid oxide core, and can also be hollow without the oxide core. The tungsten disulfide ($WS_2$) nano-particles disclosed herein may be referred to as nanologs 100. The width W1 of obtained nano-particle is considerably larger than that of widely known carbon nanotubes. As will be described further below, the width W1 of the nanologs 100 may range from 0.2 microns to 5 microns, in some examples ranging from 0.3 microns to 3 microns. The nanologs that are disclosed herein could be used for reinforcement of stiff matrices or catalyst, owing to its high surface area. The nanologs disclosed herein may have a surface area that is greater than 5 $m^2$ $gr^{-1}$, as measured by BET isotherm. For example, the nanologs 100 disclosed herein may be used as a reinforcement for concrete and polymer containing materials. In another example, the nanologs may be incorporated into polymeric composites used in additive manufacturing, e.g., 3D printing, in which the nanolog provides stiffness to the geometry being additively formed and/or improve adhesion of composite to surfaces if used as adhesive. The nanologs disclosed herein may also be utilized in materials suitable for the battery applications. The nanologs 100 may also be employed as a catalyst material.

As used herein, the term "nanolog" denotes a cluster of at least two cylindrical bodies that are in direct contact with one another and substantially aligned with one another so that their lengths are substantially parallel, wherein at least one of the cylindrical bodies has a geometry with at least one dimension that is in the nanoscale, and the cluster has an aspect ratio in which the length is greater than the width of the cluster.

The term "nanoscale" denotes a dimension of less than 1 micron. As will be explained in further detail below, in some embodiments, the width W2 of the cylindrical bodies that are clustered together to form "nano-logs" individually is on the nanoscale, and may be less than 100 nm. The term "microscale" denotes a dimension of 1 micron or greater. As will be described below, in some embodiments, the length L1 of the nano-logs, i.e., cluster of at least two cylindrical bodies. The width of the nanologs 100 is typically proximate to the microscale range, wherein the width of the nanologs 100 ranges from 0.2 microns to 5.0 microns. For example, the width of the nanologs 100 may range from 0.3 microns to 3.0 microns.

Figure 2:
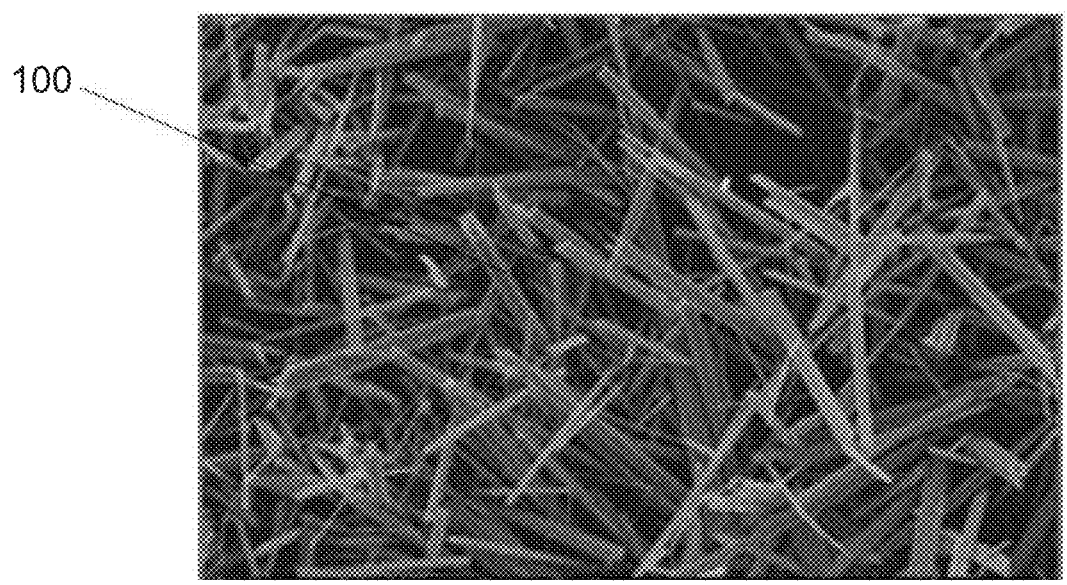
FIG. 2 is a scanning electron microscope (SEM) image of clusters of cylindrical bodies (also referred to as nanologs) composed of tungsten (W) and sulfur (S) formed from a precursor composed of WO$_{2.9}$, in which each of the cylindrical bodies has a geometry with at least one dimension that is in the nanoscale, in accordance with one embodiment of the present disclosure.

FIG. 1 is a scanning electron microscope (SEM) image of nanologs 100 composed of tungsten (W) and sulfur (S) formed from a precursor composed of $WO_3$, in which each of the nanologs 100 includes at two cylindrical bodies with at least one dimension that is in the nanoscale. By having one dimension is the nanoscale, it is meant that at least the width of the individual cylindrical bodies is nanoscale, e.g., ranging from 10 nm to 100 nm. The width of the cluster of cylindrical bodies that provides the nanologs 100 may also be on the nanoscale, but is typically in some instances ranging from 0.2 microns to 3 microns, therefore being proximate to the microscale. FIG. 2 is a scanning electron microscope (SEM) image of clusters of cylindrical bodies (also referred to as nanologs) composed of tungsten (W) and sulfur (S) formed from a precursor composed of $WO_{2.9}$. Similar to the nanologs depicted in FIG. 1, which are formed from $WO_3$, the nanologs depicted in FIG. 2 include cylindrical bodies having a geometry with at least one dimension that is in the nanoscale.

Figure 3:
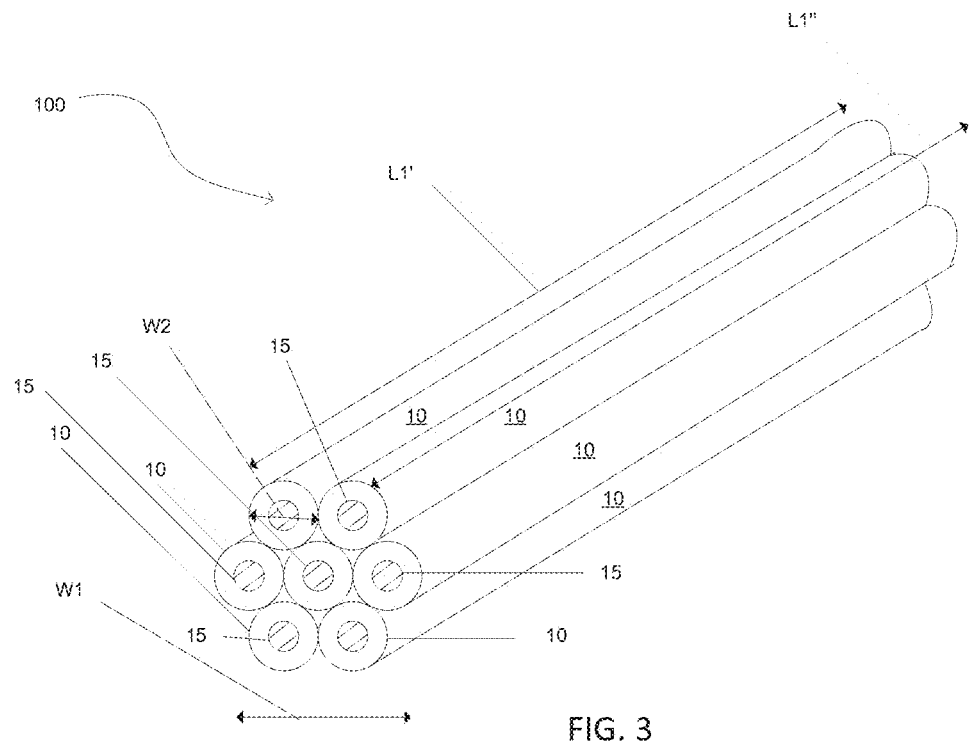
FIG. 3 is an illustration of a perspective view of clusters of cylindrical bodies (also referred to as nanologs) composed of tungsten (W) and sulfur (S) and having a hollow core, in which each of the cylindrical bodies has a geometry with at least one dimension that is in the nanoscale, in accordance with one embodiment of the present disclosure.
Figure 4:
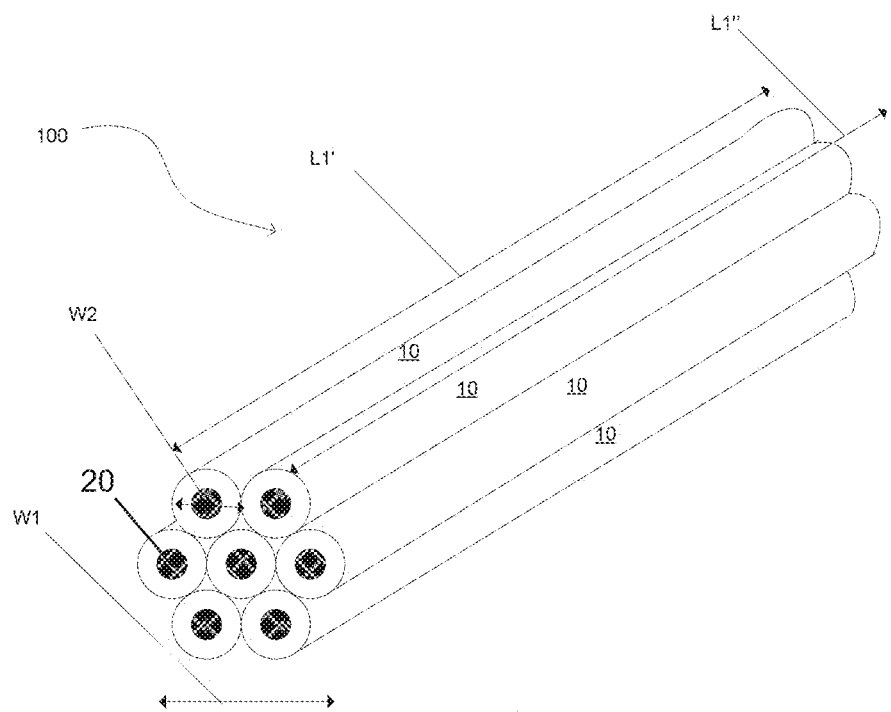
FIG. 4 is an illustration of a perspective view of clusters of cylindrical bodies (also referred to as nanologs) composed of tungsten (W) and sulfur (S) and having a solid core, in which each of the cylindrical bodies has a geometry with at least one dimension that is in the nanoscale, in accordance with one embodiment of the present disclosure.

The nanologs 100 provided by the present disclosure may include a solid core, e.g., solid core of oxide containing composition, as depicted in FIG. 3, or the nanologs 100 may have a hollow core, in which the solid core of oxide containing composition is not present, as depicted in FIG. 4. The nanologs 100 depicted in the SEMs reproduced in FIGS. 1 and 2, are now described with greater detail with reference to the illustration depicted in FIGS. 3 and 4.

FIG. 3 depicts one embodiment of clusters (also referred to as nanologs 100) of cylindrical bodies 10 composed of tungsten (W) and sulfur (S), e.g., tungsten disulfide ($WS_2$), and having a hollow core 15, in which each of the cylindrical bodies 10 has a geometry with at least one dimension that is in the nanoscale. FIG. 4 depicts one embodiment of clusters of cylindrical bodies (also referred to as nanologs 100) composed of tungsten (W) and sulfur (S) and having a solid core 20, in which each of the cylindrical bodies has a geometry with at least one dimension that is in the nanoscale.

Referring to FIGS. 3 and 4, at least the width W2 of the cylindrical bodies 10 may provide the nanoscale dimension. In other embodiments, the width W1 of the cluster, i.e., nanolog 100, of cylindrical bodies 10 may provide the nanoscale dimension. For example, the width W2 of each cylindrical body 10 may range from 10 nm to 100 nm. In another example, the width W2 of each cylindrical body 10 may range from 15 nm to 90 nm. In different examples, the width W2 of each cylindrical body 10 may be equal to 10 nm, 20 nm, 30 nm, 40 nm, 50 nm, 60 nm, 70 nm, 80 nm, 90 nm, 95 nm, 100 nm, 200 nm, 300 nm, 400 nm, or between any of the foregoing values, as well as any range using one of the aforementioned values as a minimum value for the range and one of the aforementioned values as a maximum for the range.

FIGS. 3 and 4 depict where each of the cylindrical bodies in the cluster, i.e., nanolog 100, are substantially aligned with one another so that their lengths L1', L1" are substantially parallel. The sidewalls of the cylindrical bodies are in direct contact with the adjacent sidewalls of adjacent and parallel cylindrical bodies, i.e., in contact via sidewall to sidewall. It is noted that the cluster, i.e., nanolog 100, that is depicted in FIGS. 3 and 4 include 7 cylindrical bodies, but this example has been provided for illustrative purposes only. In accordance with the methods and structures that are disclosed herein, each nanolog 100 can have any number of cylindrical bodies composed of tungsten (W) and sulfur, wherein in one example, the cluster, i.e., nanolog 100, contains between 2 and 200 cylindrical bodies. In another example, the cluster, i.e., nanolog 100, contains between 10 and 100 cylindrical bodies. In yet other examples, the cluster, i.e., nanolog 100, may include a number of cylindrical bodies that is equal 2, 5, 10, 20, 30, 40, 50, 60, 70, 80, 90, 95 and 100 cylindrical bodies, or any number of cylindrical bodies between any of the foregoing values, as well as any range of cylindrical bodies using one of the aforementioned values as a minimum value for the range and one of the aforementioned values as a maximum for the range. In one preferred example, the number of cylindrical bodies within a nanolog is equal to 35.

Referring to FIGS. 3 and 4, the width W1 of each cluster (also referred to as nanologs 100) of cylindrical bodies 10 may be in the nanoscale realm, but may also be of microscale dimension. In one embodiment, each cluster of cylindrical bodies may have a width dimension ranging from 0.2 microns to 5.0 microns, and in some examples ranging from 0.3 microns to 3.0 microns. In another embodiment, each cluster of cylindrical bodies may have a width dimension ranging from 0.5 microns to 2.0 microns. In some examples, each cluster of cylindrical bodies may have a width dimension ranging from 0.2 µm, 0.3 µm, 0.4 µm, 0.5 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8 µm, 1.9 µm and 2.0 µm, or any dimension between any of the foregoing values, as well as any range of dimensions using one of the aforementioned values as a minimum value for the range and one of the aforementioned values as a maximum for the range.

Referring to FIGS. 3 and 4, the length L1 of each cluster (also referred to as nanologs 100) is on the microscale. In some embodiments, the length L1 of each cluster is greater than 5 microns. In other embodiments, the length L1 of each cluster, i.e., nanolog 100, is greater than 8 microns. In some embodiments, the length L1 of each cluster, i.e., nanolog 100, ranges from 8 microns to 100 microns. In some examples, each cluster of cylindrical bodies may have a length L1 dimension of 5 µm, 6 µm, 7 µm, 8 µm, 9 µm, 10 µm, 20 µm, 30 µm, 40 µm, 50 µm, 60 µm, 70 µm, 80 µm, 90 µm and 100 µm, or any dimension between any of the foregoing values, as well as any range of dimensions using one of the aforementioned values as a minimum value for the range and one of the aforementioned values as a maximum for the range. It is noted that the length of each individual cylindrical body 10 may have the same or comparable length dimension as the cluster, i.e., nanolog 100.

FIG. 3 depicts clusters of cylindrical bodies (also referred to as nanologs) composed of tungsten (W) and sulfur (S) and having a hollow core 15. The hollow core 15 may be an open space that spans the entire length of the cylindrical body as substantially its center. The hollow core 15 may be substantially circular in cross section, as depicted in FIG. 3. By entire length it is meant that the hollow core 15 has a first opening at one end of the length L1 of the nanolog to the center of a cylindrical body, and has a second opening at an opposing end of the length of the nanolog, in which the open space providing the hollow core 15 is continuous from the first opening to the second opening. The diameter D1 of the hollow core 15 may be on the nanoscale. For example, the diameter of the hollow core 15 may be as great as 100 nm. In another example, the diameter of the hollow core 15 may range from 4 nm to 20 nm.

FIG. 4 is a perspective view of clusters of cylindrical bodies (also referred to as nanologs) composed of tungsten (W) and sulfur (S) and having a solid core 20. The solid core 20 may be composed of an oxide. The oxide composition of the solid core 20 may include oxygen (O), tungsten (W) and sulfur (S). In one embodiment, the oxide composition of the solid core 20 is tungsten oxide, $WO_{3-x\ (0<x<0.3)}$, e.g., $WO_{2.72}$ ($W_{18}O_{49}$), $WO_{2.9}$ ($W_{20}O_{58}$), $WO_3$ or a combination thereof. In some embodiments, the solid core 20 may be centrally positioned along the length of the cylindrical body and may have a substantially circular or multisided cross section. The solid core 20 may span the entire length of the cylindrical body as substantially its center. By entire length it is meant that the solid core 20 has a first opening at one end of the length L1 of the nanolog to the center of a cylindrical body, and has a second opening at an opposing end of the length of the nanolog, in which the centrally positioned solid core 20 is continuous from the first opening to the second opening. The diameter D1 of the solid core 20 may be on the nanoscale. For example, the diameter of the solid core 20 may be as great as 100 nm. In another example, the diameter of the solid core 20 may range from 5 nm to 20 nm.

Figure 5:
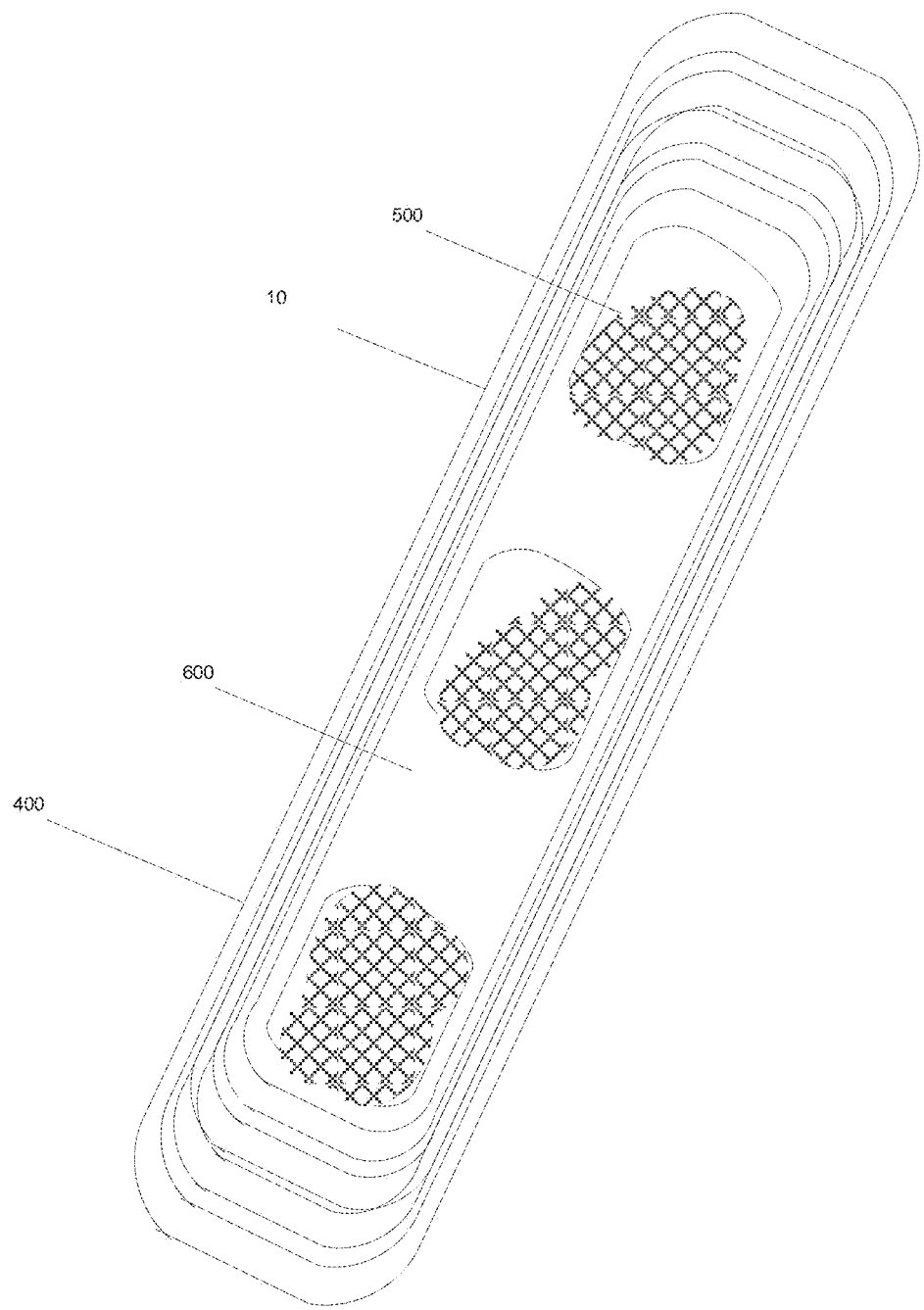
FIG. 5 is an illustration of a cylindrical body including an alternating solid oxide core and hollow core, in accordance with one embodiment of the present disclosure.

It is noted that the presence of the solid core 20 and the hollow core 15 can be controlled through processing, e.g., by controlling reaction time, for forming the clusters of cylindrical bodies (also referred to as nanologs). The effect of the reaction time on the core composition of the nanologs 100 is discussed in greater detail below, but in some instances other core geometries may be provided, such as a solid core that is present only a portion of the cylindrical body along its length. FIG. 5 depicts one embodiment of a cylindrical body 10 including a body 400 composed of tungsten (W) and sulfur (S), e.g., $WS_2$, in which the core of the cylindrical body includes a hollow portion 500 and a solid oxide portion 600, which is made of tungsten (W) and oxygen (O) or of tungsten (W), oxygen (O) and sulfur (S). In the embodiment that is depicted in FIG. 5, the solid oxide portions 600 and the hollow portions 500 alternate along the core's length. The cylindrical body 10 that is depicted in FIG. 5 may be used in any of the clusters of cylindrical bodies (also referred to as nanologs) that have been described in the present disclosure. In other examples, an oxide layer is between the tungsten and sulfur containing cylindrical body and the hollow core.

Figure 6:
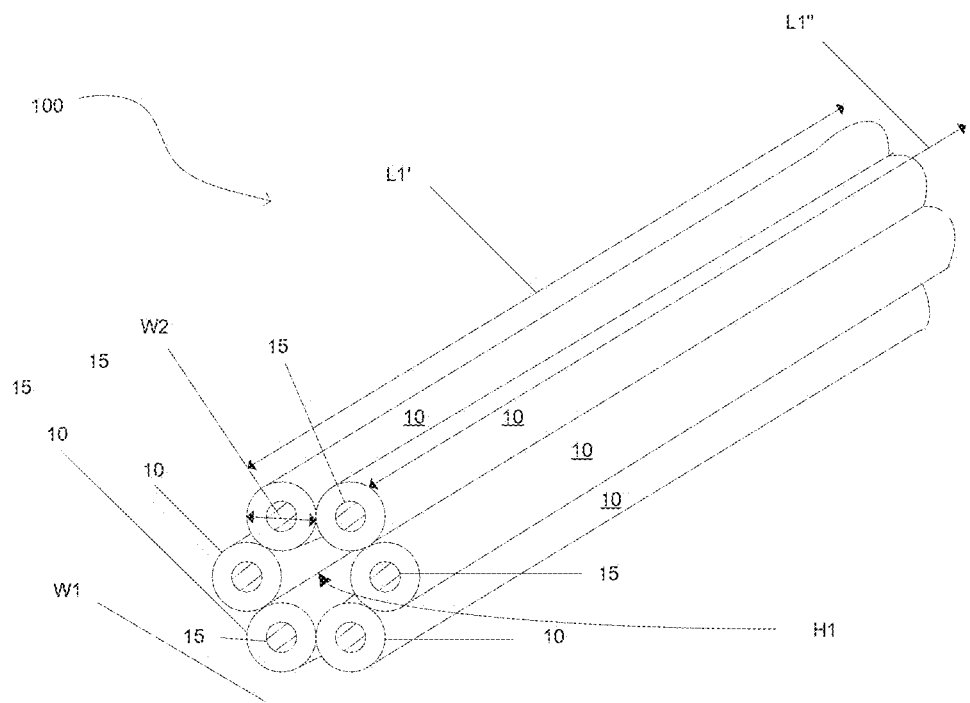
FIG. 6 is an illustration of a perspective view of clusters of cylindrical bodies (also referred to as nanologs) composed of tungsten (W) and sulfur (S), in which the core of the cluster is hollow, wherein each of the cylindrical bodies has a geometry with at least one dimension that is in the nanoscale, in accordance with one embodiment of the present disclosure.

FIG. 6 illustrates another embodiment of the present disclosure that includes clusters 100 (also referred to as nanologs) of cylindrical bodies 10 composed of tungsten (W) and sulfur (S), in which the core H1 of the cluster is hollow. Each of the cylindrical bodies 10 has a geometry with at least one dimension that is in the nanoscale. The cylindrical bodies 10 may have a hollow core 15 as depicted in FIG. 6. The cylindrical bodies 10 in this embodiment are similar to the cylindrical bodies 10 of the cluster 100, i.e., nanolog that is depicted in FIG. 3. In other embodiments, the cylindrical bodies 10 in the cluster 100 having the hollow core H1, may have a solid core 15, e.g., a solid core composed of an oxide. The cylindrical bodies 10 in this embodiment are similar to the cylindrical bodies 10 of the cluster 100, i.e., nanolog, that is depicted in FIG. 4. In another embodiment, the core H1 of the cluster may be partially hollow. In this example, a portion of a cylindrical body may be present in the core H1 of the cluster, and/or the core H1 of the cluster 100 may be partially filled with an oxide. The portion that is hollow may be present at the ends of the cylindrical body or at the center of the cylindrical body and may comprise 1/8, 1/5, 1/4, 1/3, 1/2 or up to 3/4 of the cylindrical body.

Figure 7:
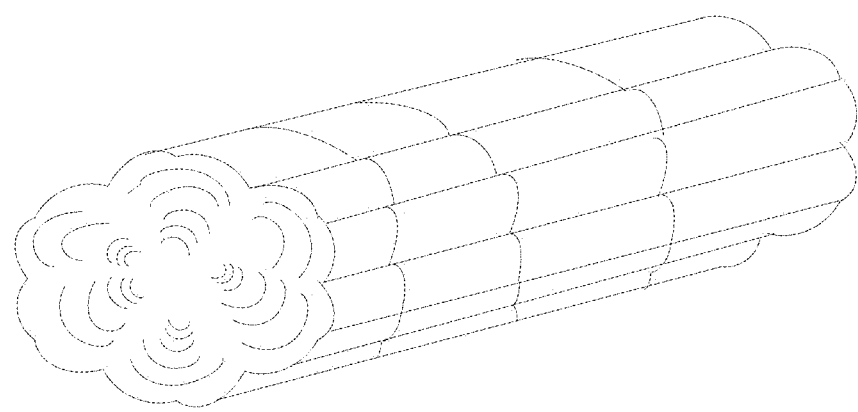
FIG. 7 is an illustration of a perspective view of clusters of cylindrical bodies (also referred to as nanologs) composed of tungsten (W) and sulfur (S), in which the core of the cluster is composed of crystalline nano-domains, wherein each of the cylindrical bodies has a geometry with at least one dimension that is in the nanoscale, in accordance with one embodiment of the present disclosure.
Figure 8:
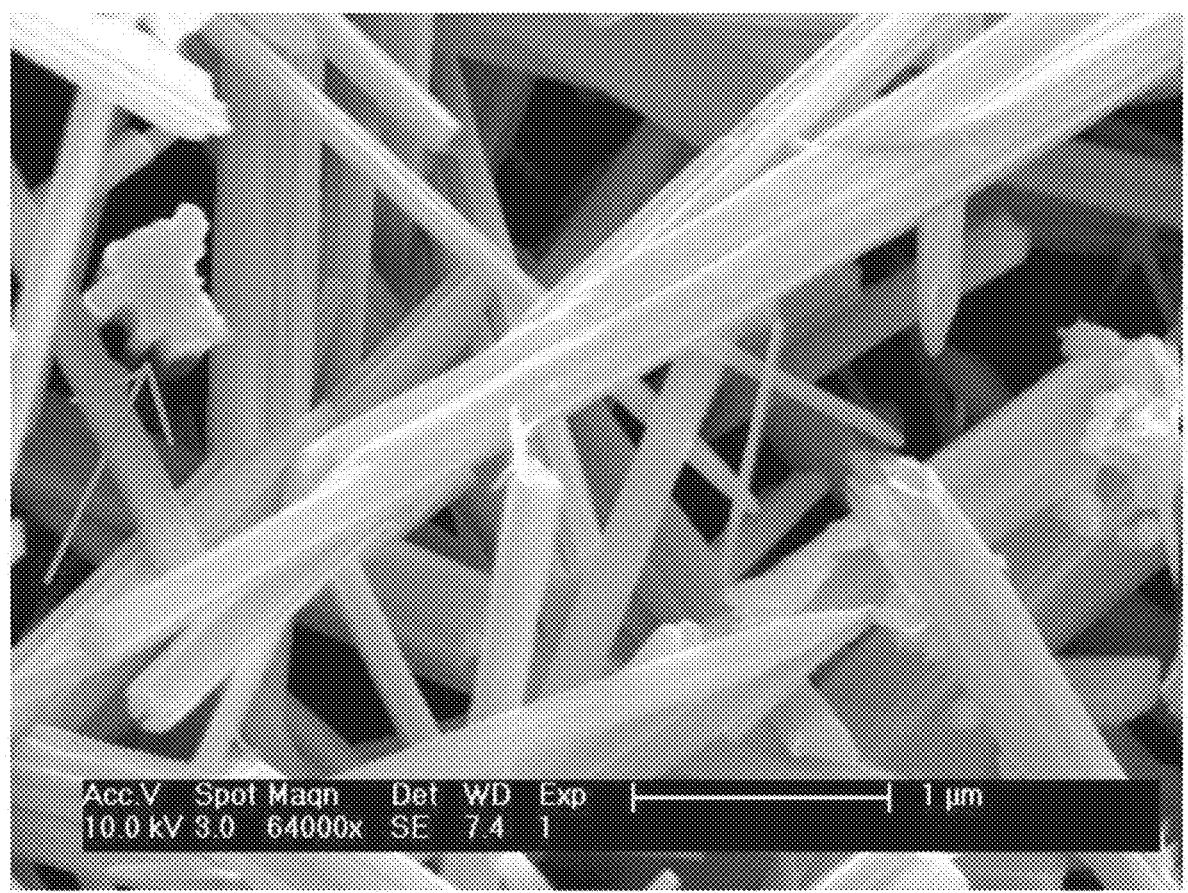
FIG. 8 is a scanning electron microscope (SEM) image of a cluster of cylindrical bodies similar to those illustrated in FIG. 7, in accordance with one embodiment of the present disclosure.
Figure 19:
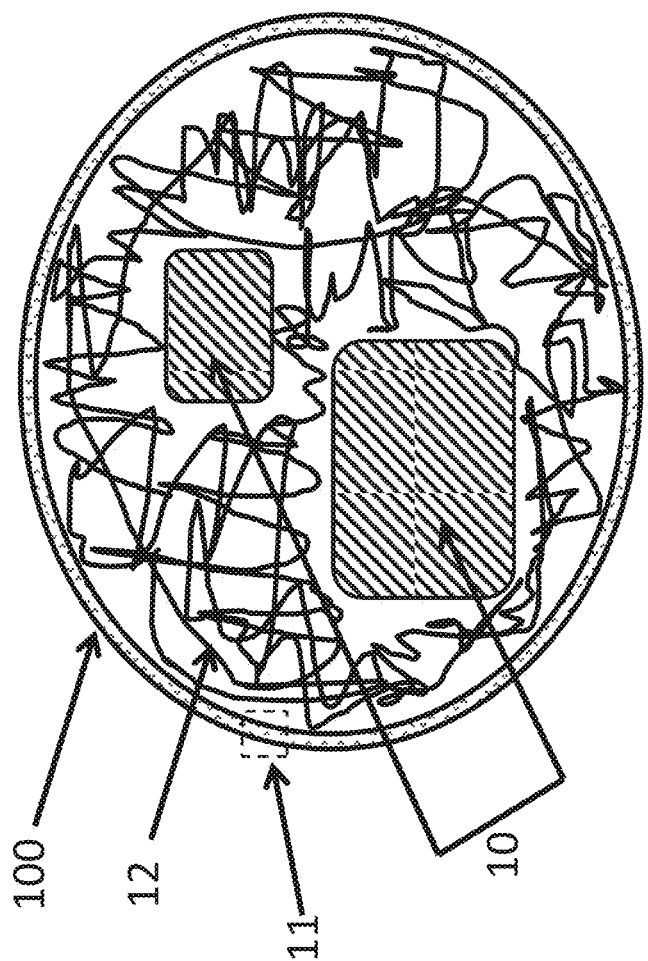
FIG. 19 is a schematic of internal cross-sectional structure of nanolog schematically shown in FIGS. 7 and 8.

FIG. 7 illustrates another embodiment of the present disclosure. In the structure depicted in FIG. 7, the cylindrical bodies (also referred to as nanologs) composed of crystalline regions composed of tungsten (W) and sulfur (S) and crystalline regions composed of tungsten (W) and oxygen (O). The crystalline regions have a regular lattice structure, i.e., repeating regular lattice structure. FIG. 8 is a scanning electron microscope (SEM) image of a cluster of cylindrical bodies similar to those illustrated in FIG. 7. FIG. 19 is schematic illustration of cross-section of cylindrical body shown in FIG. 7 which demonstrates its internal structure. The regions identified by reference number 10 are crystalline regions comprised of tungsten (W) and oxygen (O), and the regions identified by reference numbers 11 and 12 are crystalline regions comprised of tungsten (W) and sulfur (S). In one embodiment, the crystalline regions comprised of tungsten (W) and oxygen (O), which are identified by reference number 10, are more centrally positioned within the core of the cylindrical body when compared to the regions identified by reference number 11, in which the regions identified by reference number 11 are external concentric layers. By "externally concentric" it is meant that the layers have a curvature to then that extends around the majority of the core of the regions identified by reference numbers 12 and 10. The externally concentric layer may be circular (i.e., spherical), oblong, oval, and may have portions with concave and/or curvatures providing apex portions and divot portions in the concentric layer. The externally concentric layer identified by reference number 12 may be a single layer, or the external concentric layer may be a multilayered structure. In some examples, the number of layers of tungsten (W) and sulfur (S) that provide the region of externally concentric layers identified by reference number 12 may be equal to 1, 2, 5, 10, 15, 20, 25, 30, 35, 40, 45, 50, 55, 60, 65, 70, 75, 80, 85, 90, 95, 100, 200, 300, as well as any range of regions in which one of the aforementioned values provides the lower end of the range and one of the aforementioned values provides the upper end of the range. In some examples, the each layer that provides the region of externally concentric layer identified by reference number 12 may enclose the core and may be referred to as being a fully closed layer. In some embodiments, each layer of the region of external concentric layers is a fully closed layer enclosing a layer of the external concentric layer having a lesser diameter in a "nested" arrangement. By "nested" it is meant that the external concentric layer encloses a lesser diameter external concentric layer, in which the lesser diameter external concentric layer may enclose an even lesser external concentric layer. The number of nested external concentric layers may vary, e.g., be equal to 5, 10, 50, 100, etc. It is also possible that some of the nested layers be open. Contrary to a fully closed layer, an open layer does not need to be continuous, and can have breaks present in it.

In some embodiments, the crystalline regions identified by reference number 10 have a tungsten oxide ($WO_{3-x}$ ($0<x<0.3$)) composition, and the external concentric layers identified by reference number 11 have a tungsten sulfide ($WS_2$) composition.

The core regions identified by reference number 10 are typically oxides, e.g., tungsten oxide. The core regions identified by reference number 10 may be referred to as islands of oxide material. Although FIG. 19 depicts two core regions identified by reference number 10, the present disclosure is not limited by only this example. In some examples, the number of core regions, i.e., oxide containing island core regions, identified by reference number 10 may be equal to 1, 2, 3, 4, 5, 10, 15, 20, 25, 30, 35, 40, 45, 50, 60, 70, 80, 90, 100, as well as any range of layers in which one of the aforementioned values provides the lower end of the range and one of the aforementioned values provides the upper end of the range. The oxide containing island core regions identified by reference number 10 may occupy 5% to 90% of the cross-sectional area for the sectioned nanolog. In other examples, the oxide containing island core regions identified by reference number 10 may occupy 25% to 75% of the cross-sectional area for the sectioned nanolog.

Figure 24:
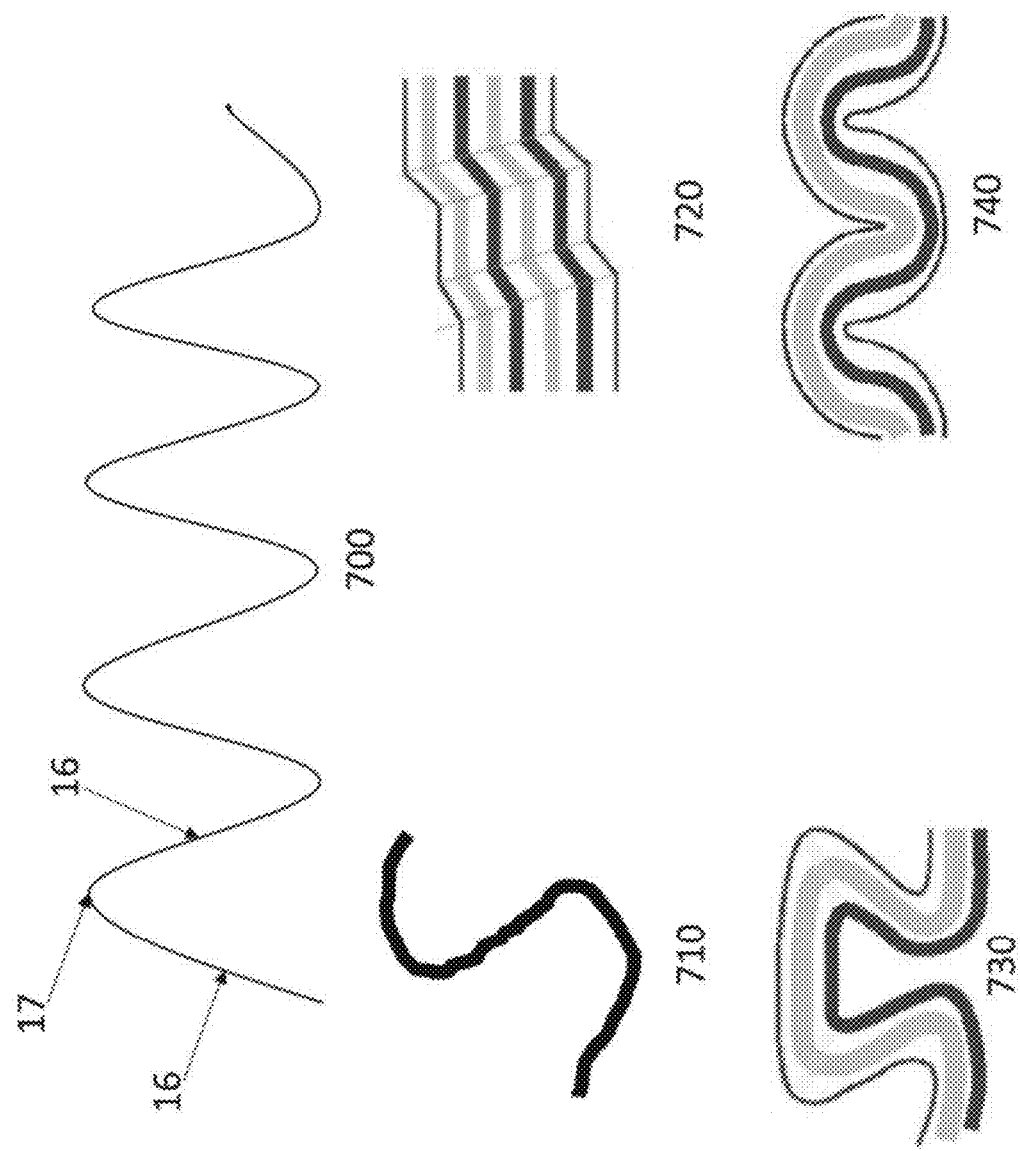

The regions identified by reference number 12 in FIG. 19 are crystalline folds of tungsten (W) and sulfur (S), e.g., tungsten sulfide ($WS_2$). As used herein, the term "fold" denotes two limbs 16, i.e., limbs 16 being at least one of curved or straight, that are connected at a hinge line 17 (or a hinge point), as depicted by the chevron shaped fold 700 in FIG. 24. The hinge 17 is the line of maximum curvature. The hinge line 17 may be straight, in which case it forms a cylindrical fold, or it may have a plunge (vertical angle between the hinge line and intersecting horizontal line) which creates a non-cylindrical fold. A fold that is convex upward, that is the limbs dip down, is called anti-form, while one that is concave upward, that is the limbs dip up, is synform. The angle defined between the two limbs 16 intersecting at the hinge line 17 may be an acute angle or an obtuse angle. For example, the angle of a single fold, i.e., fold defined by two limbs intersecting at a single hinge line 17, may range from 10 degrees to 170 degrees. In some examples, the angle may be equal to 10°, 20°, 30°, 40°, 50°, 60°, 70°, 80°, 90°, 100°, 110°, 120°, 130°, 140°, 150°, and 160°, as well as any range having an upper limit and a lower limit provided by one of the aforementioned examples.

It is also not required that the folds have a chevron geometry as illustrated by the fold having reference number 700. For example, the folds may be overturned fold as illustrated by the structure having reference number 710; the folds may be kink band folds as illustrated by the structure having reference number 720; the folds may be box folds as illustrated by the structure having reference number 730; and the folds may be concentric folds as illustrated by the structure having reference number 740. It is noted that the crystalline folds of tungsten (W) and sulfur (S), e.g., tungsten sulfide ($WS_2$), are not limited to only the above geometries, and other fold geometries are equally applicable. The plurality of folds present in the nanologs may have a number of geometries that can be randomly orientated.

The crystalline folds may be referred to as "nano-folds". "Nano-folds" are folds of crystalline material having a thickness, i.e., thickness of limb 16, ranging of less than 30 nm. In some embodiments, the thickness of the nano-folds, i.e., nano-folds of crystalline tungsten (W) and (S), e.g., crystalline tungsten sulfide ($WS_2$), may range from 5 nm to 100 nm. It is noted that these examples are only illustrative, and are not limiting, as other examples thicknesses are suitable for the layer that is in the nano-fold geometry. For example, the thickness of the nano-fold may be equal to 1 nm, 2 nm, 3 nm, 4 nm, 5 nm, 10 nm, 15 nm, 20 nm, 25 nm, 26 nm, 27 nm, 28 nm, 29 nm and 30 nm and so on, or any dimension between any of the foregoing values, as well as any range of dimensions using one of the aforementioned values as a minimum value for the range and one of the aforementioned values as a maximum for the range. In some embodiments, the thickness of the layer for the crystalline fold may be substantially uniform. The term "substantially uniform" denotes a layer having a thickness, i.e., limb thickness and/or hinge thickness, that does not deviate from greater than or less than 30% of an average value for the thickness of the layer. The length of the fold may range from the nanoscale range to the macroscale range.

The folds of tungsten sulfide ($WS_2$) are present between the regions identified on FIG. 19 by reference number 11, i.e., the external concentric layers, and the islands of oxide present at the core of the nanolog identified by reference number 10. The folds of tungsten sulfide ($WS_2$) identified by reference number 12 are also present separating the discrete island of oxide at the core of the nanolog that are identified by reference number 10.

Figures 20A, 20B:
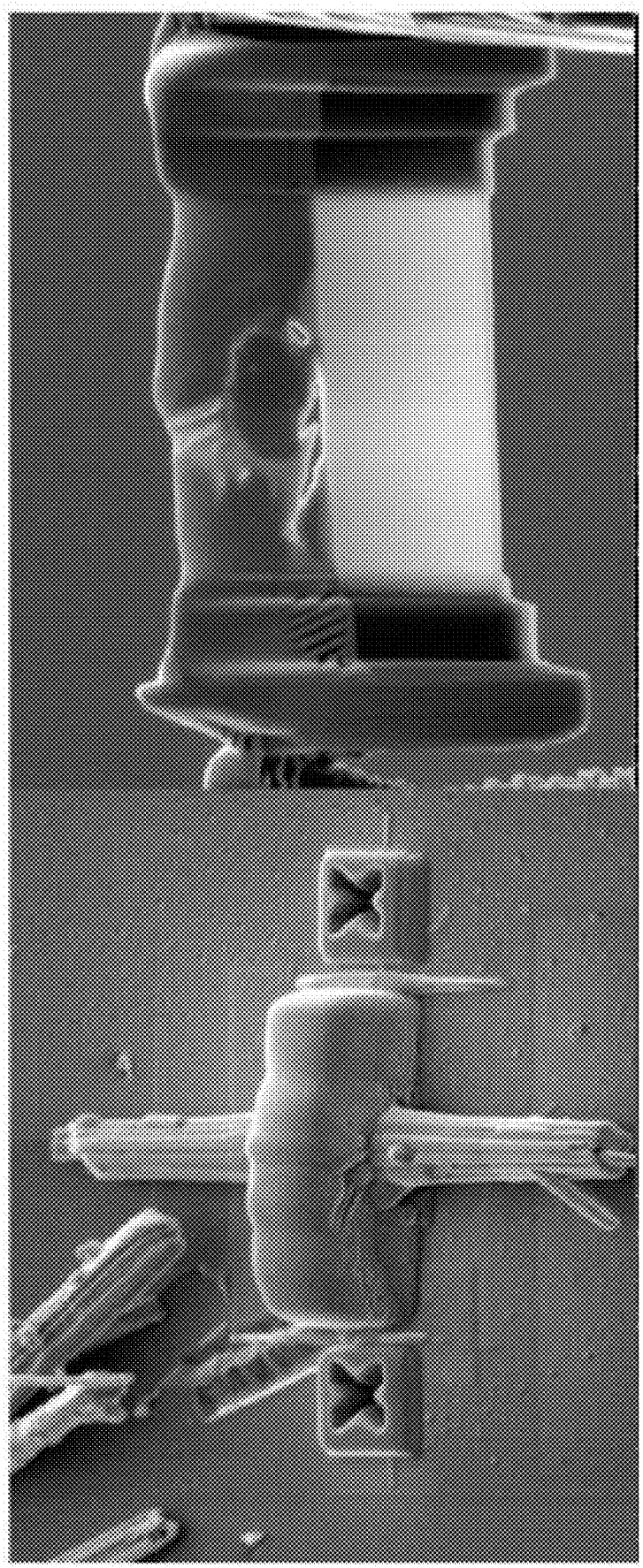
FIG. 20A is a SEM of a nanolog, in accordance with one embodiment of the present disclosure.
FIG. 20B is a SEM of a nanolog that has been sectioned using focus ion beam (FIB) methods.

FIG. 20A is a SEM of a nanolog similar to those depicted in FIG. 7, and FIG. 20B is a SEM of the nanolog depicted in FIG. 20A that has been sectioned using focus ion beam (FIB) methods to provide a cross section for imaging to provide a TEM image of an as prepared nanolog, i.e., a nanolog prior to annealing.

FIGS. 21A, 21B and 21C are cross-sectional view of two as-prepared nanologs consistent with the structures depicted in FIGS. 20A and 20B. FIGS. 21A and 21B represent high resolution TEM images of cross-sections obtained from the middle part of nanologs from two different batches. FIG. 21C is an electron energy loss spectroscopy (EELS) image of the cross-section depicted in FIG. 21B. In FIG. 21C the region identified by reference number 10a is an oxygen containing region similar to the oxygen islands of oxide present at the core of the nanolog identified by reference number 10 in FIG. 19. The region identified by reference number 13 in FIG. 21C is a sulfur (S) containing region similar to the sulfur of the sulfur containing regions identified by reference numbers 11 and 12 in FIG. 19.

FIGS. 22A and 22B are cross-sectional views of annealed nanologs. The cross-section views are prepared by method similar to that depicted in FIGS. 20A and 20B, but in FIGS. 22A and 22B the nanologs have been annealed. Therefore, the increased annealing time reduces the oxide present at the core of the nanolog. FIG. 22A represents a high resolution TEM images of cross-section obtained from the middle part of nanologs after annealing. In this example, the annealing may have include an atmosphere of nitrogen ($N_2$), helium (He), neon (Ne), argon (Ar), krypton (Kr), and xenon (Xe) and $H_2$ and $H_2S$; an annealing temperature ranging from 750° C. to 950° C., and an annealing time ranging from 1 hour to 5 hours. FIG. 22B is an EELS image of the cross-section in FIG. 22A. In FIG. 22B, the region identified by reference number 10a is an oxygen containing region similar to the oxygen islands of oxide present at the core of the nanolog identified by reference number 10 in FIG. 19. The region identified by reference number 13 in FIG. 22B is a sulfur (S) containing region similar to the sulfur of the sulfur containing regions identified by reference numbers 11 and 12 in FIG. 19. Comparison on the oxide region 10a that is depicted in FIG. 21C with the oxide region 10a depicted in FIG. 22B illustrates how the oxide present at the core of the nanolog decreases with increasing anneal time.

Figure 9:
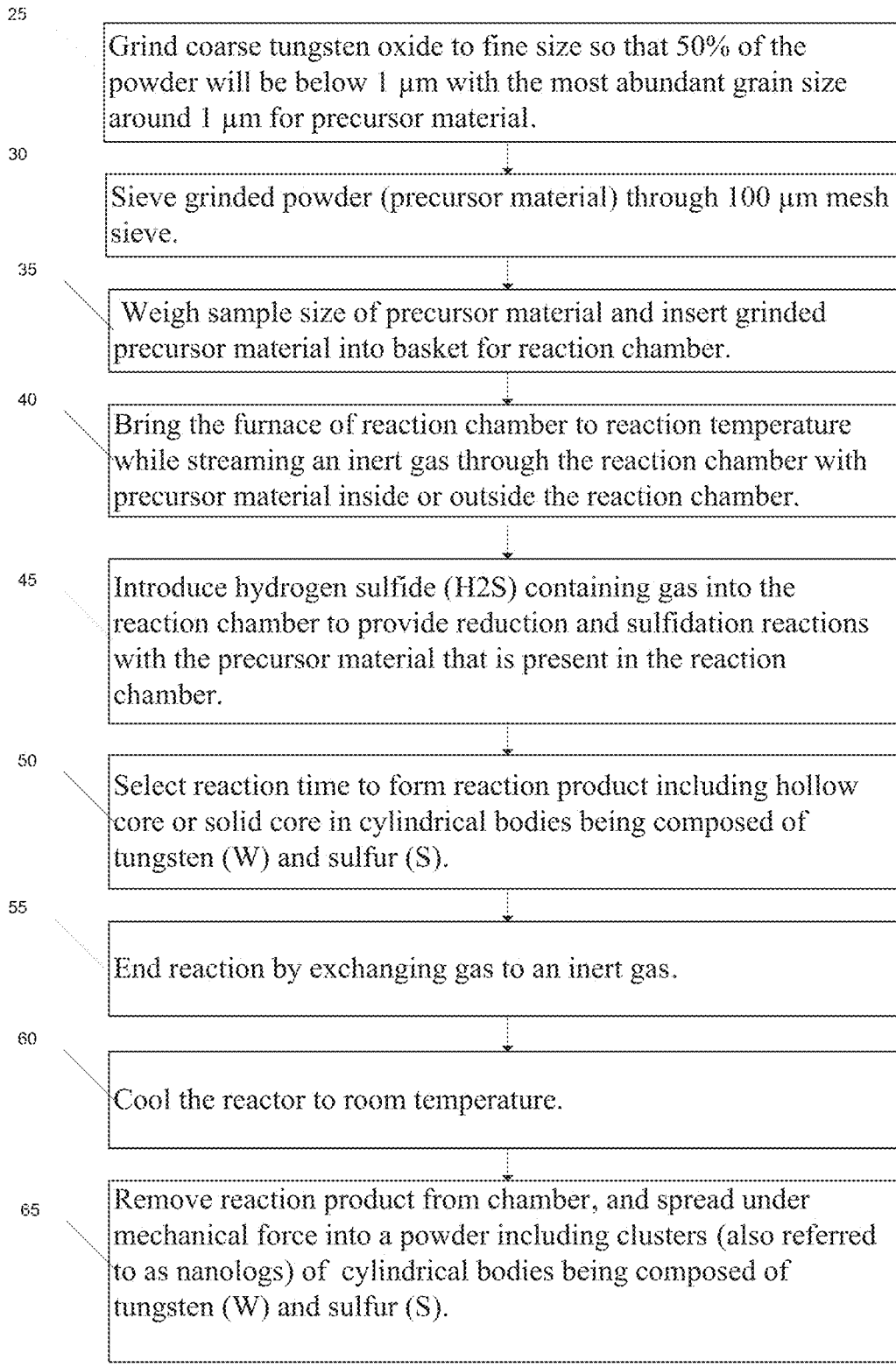
FIG. 9 is a flow diagram for one embodiment of a method of forming clusters of cylindrical bodies (also referred to as nanologs) composed of tungsten (W) and sulfur (S), in accordance with one embodiment of the present disclosure.

FIG. 9 is a flow diagram for one embodiment of a method of forming clusters of cylindrical bodies, i.e., nanologs, composed of tungsten (W) and sulfur (S). In some examples, the tungsten powder may be provided by $\beta$-$WO_{2.9}$, $\alpha$-$WO_3$, $\gamma$-$WO_3$ or a combination thereof. The use of $WO_3$ may be selected in one embodiment of the method to provide clusters of cylindrical bodies, i.e., nanologs 100, which are depicted in FIG. 1. The use of $WO_{2.9}$ is selected in one embodiment of the method to provide clusters of cylindrical bodies, i.e., nanologs 100, that are depicted in FIG. 2. In some embodiment, the tungsten oxide powder has an initial particle size ranging from 0.1 microns to 2 microns.

In some embodiments, the initial tungsten oxide powder, e.g., $WO_{2.9}$, $WO_3$ or a combination thereof, is ground from a coarse particle size to a fine size. The initial tungsten oxide powder, e.g., $WO_{2.9}$, $WO_3$ or a combination thereof, may be mechanically ground. For example, the initial tungsten oxide powder, e.g., $WO_{2.9}$, $WO_3$ or a combination thereof, is mechanically ground using at least one of high-shear mixers, two or three roll mixers, homogenizers, bead mills, ultrasonic pulverizer, attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-Stator mixer, homogenizer/emulsifier, high shear mixer, conical blender, V-blender, double cone blender, suspended mixer and combinations thereof. In some embodiments, a fluid medium, such as water or an alcohol, is employed during milling.

In a following step 30, the ground powder is fluffed through a sieve.

At step 35, the precursor material, i.e., tungsten oxide power, is weighed and prepared for being inserted into the reaction chamber of a device for providing reduction and sulfidation processes at elevated temperatures resulting in a yield of approximately 95% nanologs.

Figure 10:
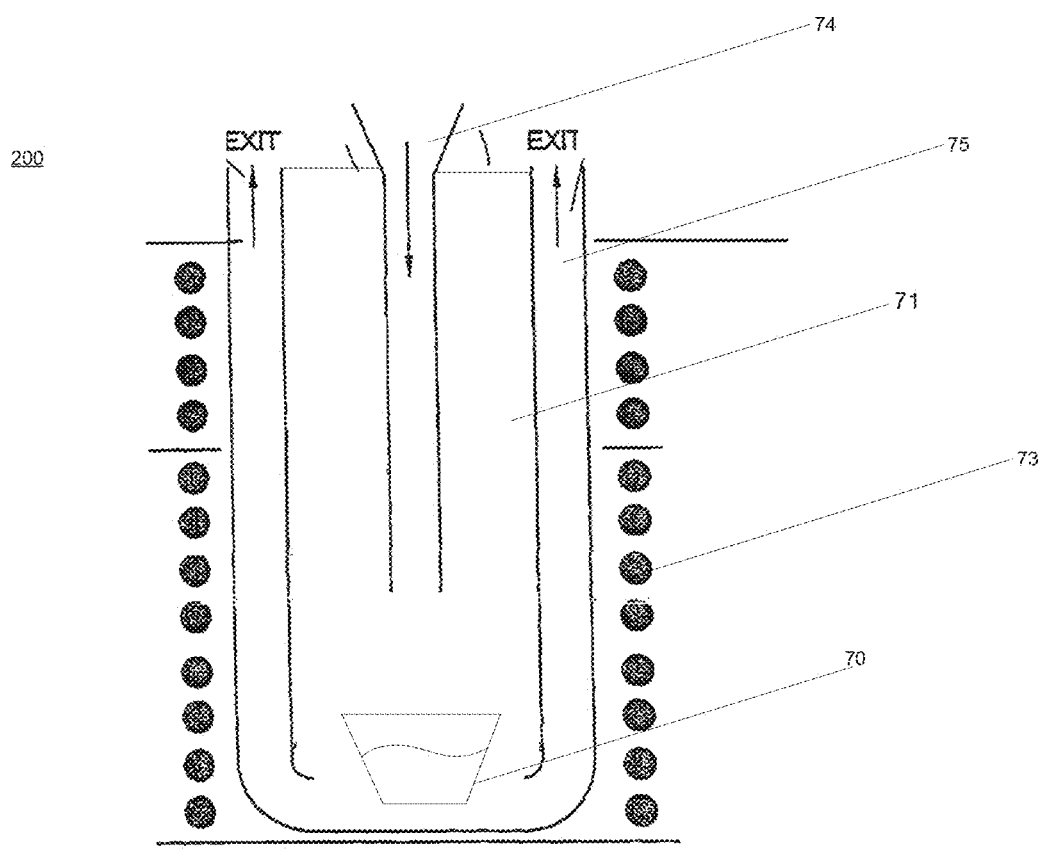
FIG. 10 is a schematic of a reaction chamber and furnace as used in the method of forming clusters of cylindrical bodies (also referred to as nanologs) composed of tungsten (W) and sulfur (S) described with reference to FIG. 9, in accordance with one embodiment of the present disclosure.

At step 35, the method continues with weighing a sample of precursor material and inserting the precursor material into the basket of the reaction chamber of a furnace through which reactive gasses will be passed in the following described method steps. One embodiment of a furnace 200 for forming the clusters of cylindrical bodies, i.e., nanologs 100 is depicted in FIG. 10, in which the basket 70 containing the precursor sample is depicted within the reaction chamber 71 having heating elements 73 at the perimeter of the reaction chamber 71.

At step 40, the method may continue with bringing the reaction chamber 71 to a reaction temperature with the furnace, i.e., heating elements 73, while streaming an inert gas through the reaction chamber with precursor material inside or outside the reaction chamber 71. The term "reaction chamber" denotes a temperature at which sulfidation and reduction reactions can occur with the precursor material. In some embodiments, the reaction temperature may range from 750° C. to 950° C. In other embodiments, the reaction temperature may range from 800° C. to 900° C. In one example, the reaction temperature may be on the order of approximately 850° C. The inert gas in some instances may include nitrogen ($N_2$) gas. It is noted that nitrogen is not the only inert gas that may be employed at this stage of the process. Other noble gasses that can be used for the inert gas may include helium (He), neon (Ne), argon (Ar), krypton (Kr), and xenon (Xe). The gas flow flux of the inert gas may be kept below 57 cc/min cm$^2$ through reactor cross section.

In a following process step, hydrogen sulfide ($H_2S$) containing gas may be introduced to the reaction chamber 71 to provide reduction and sulfidation reactions with the precursor that is present in the reaction chamber 71 at step 45. Sulfidation is a process of installing sulfur ions in a material or molecule, and/or replacing oxygen atoms with sulfur atoms. An oxidation-reduction (redox) reaction is a type of chemical reaction that involves a transfer of electrons between two species. An oxidation-reduction reaction is any chemical reaction in which the oxidation number of a molecule, atom, or ion changes by gaining or losing an electron. In the embodiments, in which the precursor material is not present in the reaction chamber during step 40, at which the temperature of the reaction chamber 71 is increased to the reaction temperature, the precursor material may be positioned within the reaction chamber 71 before applying the hydrogen sulfide ($H_2S$) containing gas.

Referring to step 45, in some embodiments, introducing the hydrogen sulfide ($H_2S$) containing gas to the reaction chamber 71 may include maintaining the temperature of the reaction chamber 71 at the reaction temperature, e.g., about 850° C., while reacting the precursor material with a reaction gas mixture including at least one of nitrogen gas ($N_2$) and hydrogen gas ($H_2$). In one embodiment, the hydrogen sulfide containing gas introduced into the reaction chamber 71 after the reaction temperature has been reached comprises exchanging the inert gas atmosphere from step 40 with an atmosphere comprising 30% to 50% hydrogen sulfide ($H_2S$) gas, and 30% to 50% hydrogen ($H_2$) gas. The reaction gas, e.g., hydrogen sulfide ($H_2S$), nitrogen gas ($N_2$), and hydrogen gas ($H_2$), is flowed through the reaction chamber 71 entering through the reaction gas inlet 74 flowing past, and in some cases through the basket 70 of precursor material, and exiting through a reaction gas outlet 75. In one example, the reduction and sulfidation reactions between the reaction gasses, which include hydrogen sulfide ($H_2S$) and the precursor material, e.g., $WO_3$ and/or $WO_{2.9}$, to provide cylindrical bodies, i.e., nanologs 100, composed of tungsten disulfide ($WS_2$) are illustrated in Equation (1) as follows:

$$WO_3 + H_2 + 2H_2S \rightarrow WS_2 + 3H_2O \quad \text{Equation (1)}$$

In one example, step 45 of the process disclosed in FIG. 9, includes reacting powder with mixture of $N_2/H_2/H_2S$ with ratio 1:2:2 for at least 1 hour with the precursor material.

Referring to FIG. 9, in some embodiments, the method continues with selecting the reaction time to determine whether the reaction product includes a hollow core or a solid core in cylindrical bodies being composed of tungsten (W) and sulfur (S) at step 50. In some embodiments, the time period for introducing the hydrogen sulfide containing gas to the reaction chamber 71 to react with the precursor material of tungsten oxide, e.g., $WO_3$ and/or $WO_{2.9}$, for producing the hollow core is greater than a time period for creating the solid core. For example, in some embodiments, the time period for producing the cylindrical bodies, i.e., nanologs 100, composed of tungsten disulfide ($WS_2$), having the solid core is greater than 1 hour and less than 6 hours. In other embodiments, the time period for producing the cylindrical bodies, i.e., nanologs 100, composed of tungsten disulfide ($WS_2$), having the solid core is greater than 1.5 hours and less than 5 hours. In other examples, the time period for producing the cylindrical bodies, i.e., nanologs 100, having a solid core may be 0.75 hours, 1 hour, 1.25 hours, 1.5 hours, 1.75 hours, 2.0 hours, 2.25 hours, 2.5 hours, 2.75 hours, 3.0 hours, 3.25 hours, 3.5 hours, 3.75 hours, 4.0 hours, 4.25 hours, 4.5 hours, 4.75 hours, 5.0 hours, 5.25 hours, 5.5 hours, 5.75 hours and 6 hours, or any time between any of the foregoing values, as well as any range of dimensions using one of the aforementioned values as a minimum value for the range and one of the aforementioned values as a maximum for the range.

In another embodiment, the time period for application of the reactive gasses in producing the cylindrical bodies, i.e., nanologs 100, composed of tungsten disulfide ($WS_2$), is selected to provide a hollow core. As noted above, the time period for the production of the cylindrical bodies, i.e., nanologs 100, having a hollow core is typically greater than the time period for the production of the cylindrical bodies, i.e., nanologs 100, having a solid core. For example, in some embodiments, the time period for applying the reactive gasses to the precursor material for producing the clusters of cylindrical bodies, i.e., nanologs 100, composed of tungsten disulfide ($WS_2$), having the hollow core is greater than 5 hours. In some embodiments, the time period for producing the cylindrical bodies, i.e., nanologs 100, composed of tungsten disulfide ($WS_2$), having the hollow core ranges from 6 hours to 10 hours. In other examples, the time period for producing the cylindrical bodies, i.e., nanologs 100, having the hollow core may be 5.75 hours, 6 hours, 6.25 hours, 6.5 hours, 6.75 hours, 7.0 hours, 7.25 hours, 7.5 hours, 7.75 hours, 8.0 hours, 8.25 hours, 8.5 hours, 8.75 hours, 9.0 hours, 9.25 hours, 9.5 hours, 9.75 hours, and 10 hours, or any time between any of the foregoing values, as well as any range of dimensions using one of the aforementioned values as a minimum value for the range and one of the aforementioned values as a maximum for the range.

Following the reaction with the reaction gasses, the precursor material may hereafter be referred to as the reaction product. The reaction product includes pluralities of the clusters of cylindrical bodies, i.e., nanologs 100, which are engaged to one another in a unitary body, which is typically contained in the basket 70 of the reaction chamber 71.

In some embodiments, the method continues with substituting the reaction gasses with an inert gas, such as nitrogen gas ($N_2$) at step 55 of the method illustrated in FIG. 9. In some embodiments, substituting the inert gas, such as nitrogen gas ($N_2$), with the reaction gasses at step 55 ends the reaction with the precursor material that provides the reaction product. The inert gas used at step 55 is not limited to only nitrogen, as other inert gasses may also be employed at this stage of the present disclosure. For example, other noble gasses that can be used for the inert gas may include helium (He), neon (Ne), argon (Ar), krypton (Kr), xenon (Xe), and the radioactive radon (Rn). The inert gas may be introduced to the reaction chamber through the reaction gas inlet 74 flowing past, and in some cases through the basket 70 of precursor material/reaction product, and exiting through a reaction gas outlet 75.

At step 60 of the method depicted in FIG. 9, the reaction chamber 71 containing the reaction product may be allowed to cool to a temperature that allows for the reaction product to be handled for mechanical separation into the clusters of cylindrical bodies that provide the nanologs 100. In some embodiments, the reaction product may be allowed to cool to substantially room temperature, e.g., 20° C. to 25° C., at atmospheric pressure. Once the reaction product is allowed to cool, the reaction product is mechanically separated and spread into a powder of the clusters of cylindrical bodies, i.e., nanologs 100, as described above with reference to FIGS. 1-9, using a moderate mechanical force at step 65. For example, the sulfided reactant may be separated into a powder containing clusters of cylindrical bodies composed of tungsten (W) and sulfur (S), wherein each of the cylindrical bodies has a geometry with at least one dimension that is in the nanoscale, and said each cluster of cylindrical bodies may have a width dimension ranging from 0.3 microns to 2.0 microns, and a length greater than 5.0 microns.

Figure 11:
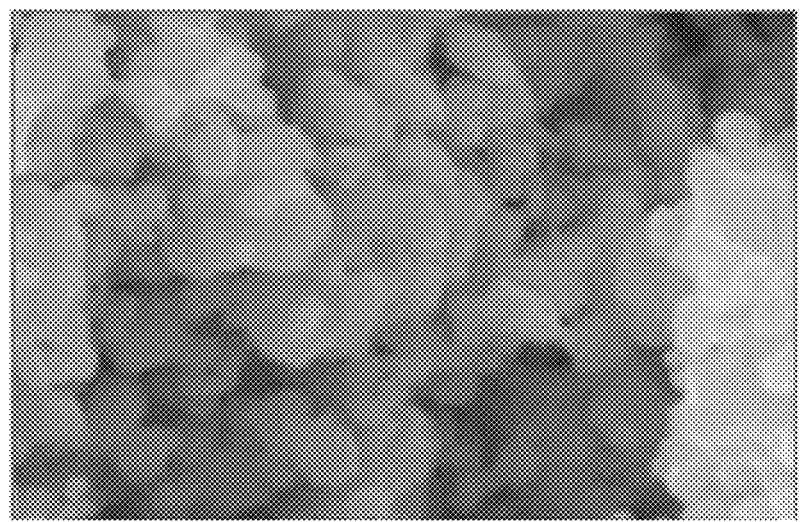
FIG. 11 is a scanning electron microscope (SEM) image of a powder composed of WO$_{2.9}$ particles, in accordance with one embodiment of the present disclosure.

In another aspect of the present disclosure a method is provided for forming nanospheres composed of $WO_{2.9}$. In some instances, the spherical nanoparticles of tungsten oxide ($WO_{2.9}$) may be perfectly spherical, i.e., having the form of a sphere. A characteristic image of tungsten oxide ($WO_{2.9}$) produced in accordance with the methods and structures of the present disclosure is illustrated in FIG. 11. FIG. 11 depicts one embodiment of tungsten oxide ($WO_{2.9}$) that may be perfectly spherical or close to being perfectly spherical.

The spherical nanoparticles of tungsten oxide ($WO_{2.9}$) can provide the tungsten oxide powder that is processed at step 25, i.e., grinding coarse tungsten oxide to fine size so that 50% of the powder will be below 1 µm with the most abundant grain size around 1 µm for precursor material, of the method depicted in FIG. 9 to produce a precursor material having a reduced particle size for forming the clusters of cylindrical bodies that provide the nanologs 100.

In some embodiments, the method of making tungsten oxide ($WO_{2.9}$) includes reducing a particle size of $WO_3$ powder to produce a $WO_3$ precursor material having a reduced particle size. The $WO_3$ powder (prior to being processed to the reduced particle size) that is used in this step of the present disclosure may have an initial particle size (prior to processing to the reduced particle size) that ranges from 0.1 micron to 2 microns.

In some embodiments, mechanical methods, such as milling, may be used to reduce the particles size of the $WO_3$ powder. It is noted, that the milling, i.e., reduction of particle size for the $WO_3$ powder, in the method of forming spherical tungsten oxide ($WO_{2.9}$) is similar to the reduction of the $WO_3$ powder described in step 25 of the method illustrated in FIG. 9. Therefore, the above description of step 25 of the method illustrated in FIG. 9 may be suitable for describing the reduction in particle size applied to the $WO_3$ powder used in methods for forming tungsten oxide ($WO_{2.9}$) having a spherical nanostructure, i.e., being nanospheres. The reduced particle size powder of $WO_3$ that is used to form the nanospheres composed of tungsten oxide ($WO_{2.9}$) may then be sieved using similar sizing methods, as described above for step 30 of the method illustrated in FIG. 9. In a following step, the powder of tungsten oxide ($WO_3$) (hereafter referred to as precursor material for forming tungsten oxide ($WO_{2.9}$)) may then be weighted and placed in the reaction chamber 71 of the furnace containing device 200 for reaction with hydrogen sulfide gas containing reaction gasses, as depicted in FIG. 9.

Once the precursor material for forming tungsten oxide ($WO_{2.9}$) is loaded into the reaction chamber, the reaction chamber 71, the temperature of the reaction chamber 71 is raised to the reaction temperature, and reaction gasses are flowed through the reaction chamber 71 to convert the precursor material into the substantially spherical tungsten oxide ($WO_{2.9}$). In some embodiments, the substantially spherical tungsten oxide ($WO_{2.9}$) is made from $WO_3$ by a similar procedure as the procedures described above for forming the nanologs, as illustrated in FIG. 9. For example, the method may include heating the precursor material for forming the tungsten oxide ($WO_{2.9}$) in a chamber to a reaction temperature ranging from 400° C. to 700° C. in an inert atmosphere. This step may be similar to step 40 of the method depicted in FIG. 9.

Once the reaction temperature is reached, a reaction atmosphere is introduced to reaction chamber housing the precursor material, in which the reaction atmosphere includes 5% to 45% hydrogen gas, and 55% to 95% of nitrogen gas. The reaction time may be less than 1 hour, wherein the $WO_3$ precursor material is converted to a reaction product of substantially spherical tungsten oxide ($WO_{2.9}$). This step is similar to step 45 of the method of forming the nanologs 100 that is depicted in FIG. 9. In one example, the reaction temperature for forming the substantially spherical tungsten oxide ($WO_{2.9}$) is 530° C., and the precursor material is reacted with reactive gasses including approximately 20% $H_2$ for a reaction time period of 10 min to provide a reaction product of substantially spherical tungsten oxide ($WO_{2.9}$). The same material, i.e., substantially spherical tungsten oxide ($WO_{2.9}$), was obtained at reaction temperatures ranging from 480° C. to 602° C. with a hydrogen reactive gas ($H_2$) content of 6-41% over reaction times ranging from 6 minutes to 60 minutes.

Figure 12:
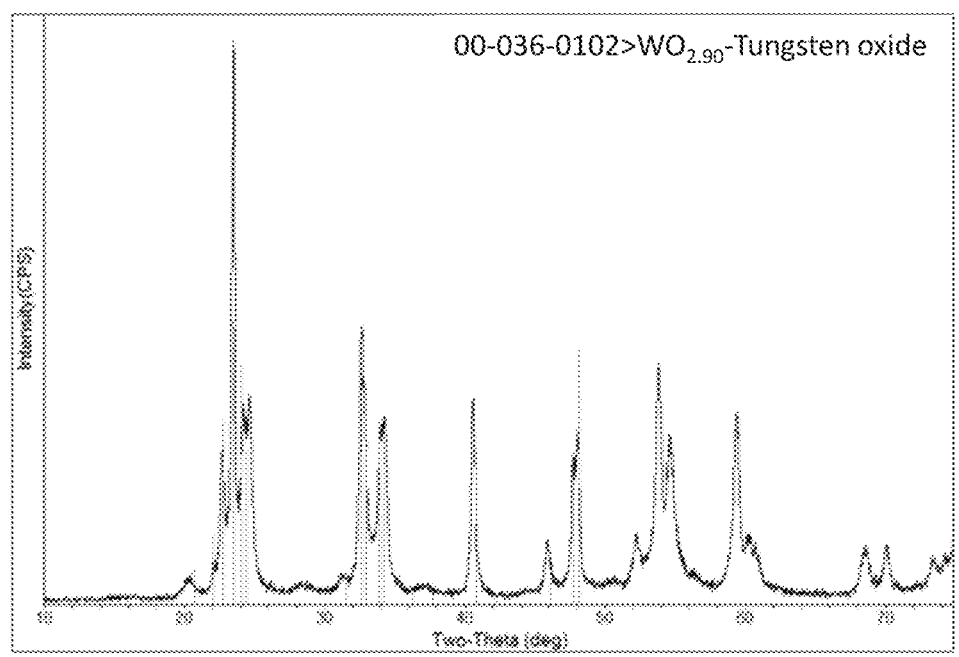
FIG. 12 is a X-ray diffraction pattern of a powder composed of WO$_{2.9}$ particles, in accordance with one embodiment of the present disclosure.

Once the reactive gasses react with the precursor material to provide the reaction product composed of spherical tungsten oxide ($WO_{2.9}$), the product may be allowed to cool to a handling temperature, e.g., room temperature (20° C. to 25° C.), and the reaction product may be mechanically separated into a powder containing nanospheres composed of $WO_{2.9}$. The diameter of the spherical tungsten oxide ($WO_{2.9}$) may range from 0.01 microns to 100 microns. FIG. 12 is a x-ray diffraction pattern of a powder composed of $WO_{2.9}$ particles that can be formed using the above described method.

Composites Employing Nanologs

A composite is a material composed of two or more distinct phases, e.g., matrix phase and dispersed phase, and having bulk properties different from those of any of the constituents by themselves. As used herein, the term "matrix phase" denotes the phase of the composite that is present in a majority of the composite, and contains the dispersed phase, and shares a load with it. In the present case, the matrix phase may be provided by a polymer or concrete. As used herein, the term "dispersed phase" denotes a second phase (or phases) that is embedded in the matrix phase of the composite. In some embodiments, the dispersed phase may be uniformly distributed throughout the entirety of the matrix phase. In other embodiments, the dispersed phase may be graded. By being graded it is meant that in some embodiments, the dispersed phase may be present in one portion of the matrix in a greater concentration than another portion of the matrix. Dispersion can be a situation when 1/N (N=1,2,3,4 . . . ) of admixed material's mass occupies 1/N (N=1,2,3,4 . . . ) of matrix volume.

Concrete Reinforcement

In one embodiment, the nanologs 100, i.e., clusters of cylindrical bodies of tungsten disulfide ($W_2S$), that have been described above with reference to FIGS. 1-9 may be used in structural/building materials for mechanical reinforcement. Cement, one of the most widely used composite materials, is characterized by high compressive strength on the one hand and by low tensile, flexural and fracture toughness properties on the other. In some embodiments, the tensile, flexural and fracture toughness of a cement composition may be improved by introducing a dispersed phase of nanologs 100, i.e., clusters of cylindrical bodies of tungsten disulfide ($W_2S$), through a matrix phase of the cement composition.

Figure 13:
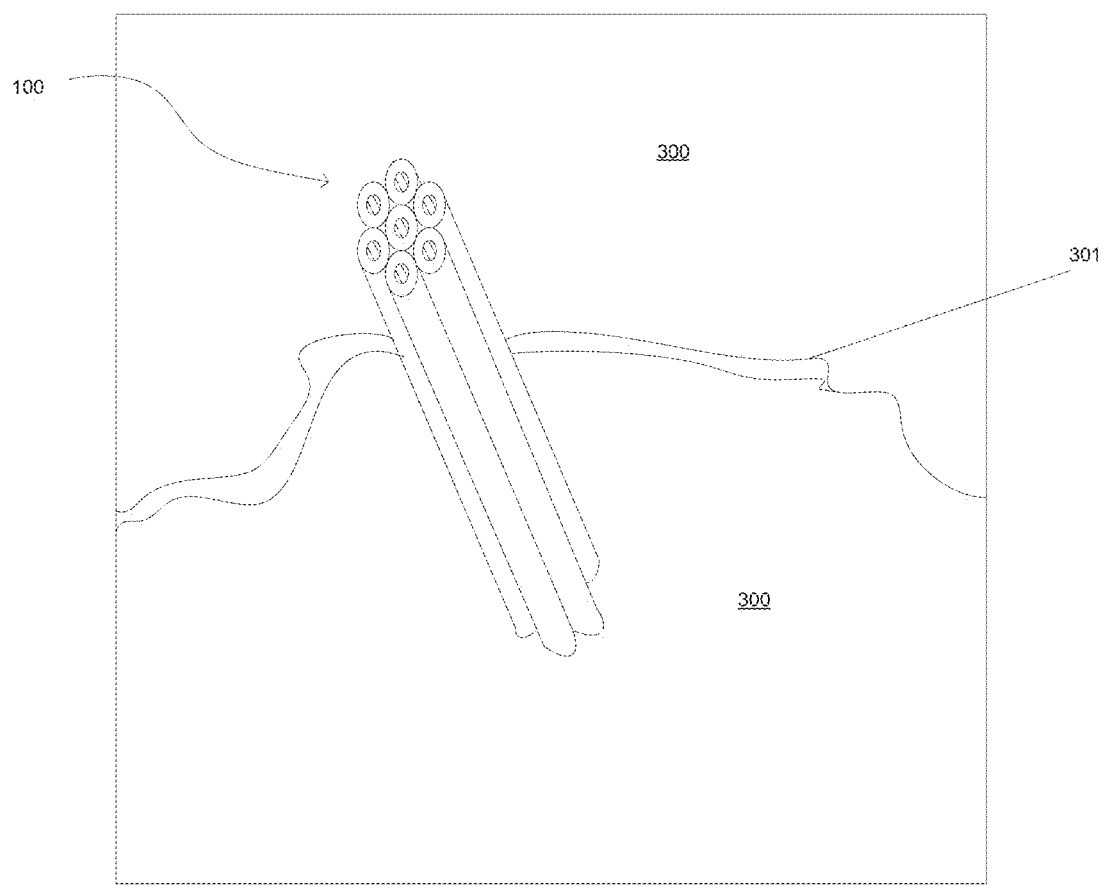
FIG. 13 is a schematic of clusters of cylindrical bodies (also referred to as nanologs) composed of tungsten (W) and sulfur (S) reinforcing a concrete composition, in accordance with one embodiment of the present disclosure.

FIG. 13 is a schematic illustrating a cluster of cylindrical bodies (also referred to as nanologs 100) composed of tungsten (W) and sulfur (S) acting as a dispersed phase reinforcing a matrix of concrete composition 300, in accordance with one embodiment of the present disclosure. In some embodiments, the dispersed phase of nanologs 100, i.e., clusters of cylindrical bodies of tungsten disulfide ($W_2S$), inhibit crack 301 propagation by bridging, and fail via pullout mechanism. Typically, the dispersed phase of nanologs 100, i.e., clusters of cylindrical bodies of tungsten disulfide ($W_2S$), increase flexural strength by greater than 50% when compared to similar compositions for the concrete/cement/beton that do not include the dispersed phase of nanologs 100, i.e., clusters of cylindrical bodies of tungsten disulfide ($W_2S$).

In one embodiment, the composition may include a matrix composition composed of at least one of calcium oxide, silicon oxide and aluminum oxide (e.g., matrix of concrete composition 300); and a dispersed phase composition comprising clusters of substantially cylindrical bodies comprising tungsten (W) and sulfur (S) (also referred to as nanologs 100), wherein each of the cylindrical bodies has a geometry with at least one dimension that is in the nanoscale. In one embodiment, each cluster of cylindrical bodies has a width dimension ranging from 0.3 microns to 2.0 microns, and a length greater than 5.0 microns.

The matrix composition composed of at least one of calcium oxide, silicon oxide and aluminum oxide (e.g., matrix of concrete composition 300) may also be referred to as a Portland cement composition, or concrete, or beton.

In the most general sense, cement, such as Portland cement, is produced by heating sources of lime, iron, silica, and alumina to clinkering temperature (2,500 to 2,800 degrees Fahrenheit) in a rotating kiln, then grinding the clinker to a fine powder. The heating that occurs in the kiln transforms the raw materials into new chemical compounds. Therefore, in some embodiments, the chemical composition of the cement is defined by the mass percentages and composition of the raw sources of lime, iron, silica, and alumina as well as the temperature and duration of heating.

In some examples, the Portland cements and blended hydraulic cements for concrete that may provide the matrix composition for the composite conform to the American Society for Testing and Materials (ASTM) C150 (Standard Specification for Portland Cement), C595 (Standard Specification for Blended Hydraulic Cement) or C1157 (Performance Specification for Hydraulic Cements). Other specifications of cement/concrete compositions that are suitable for use with the present disclosure include AASHTO M 85 for Portland cement and M 240 for blended cements.

In some embodiments, the matrix of the concrete composition 300 is composed of tricalcium silicate ($3CaO.SiO_2$), dicalcium silicate ($2CaO.SiO_2$), tricalcium aluminate ($3CaO.Al_2O_3$), and a tetra-calcium aluminoferrite ($4CaO.Al_2O_3Fe_2O_3$). In an abbreviated notation differing from the normal atomic symbols, these compounds are designated as $C_3S$, $C_2S$, $C_3A$, and $C_4AF$, where C stands for calcium oxide (lime), S for silica, A for alumina, and F for iron oxide. Small amounts of uncombined lime and magnesia also are present, along with alkalines and minor amounts of other elements. Some examples for Portland cement compositions that are suitable for reinforcement with the dispersed phase of nanologs 100, i.e., clusters of cylindrical bodies of tungsten disulfide ($W_2S$) are included in the following Table 1.

TABLE 1

CEMENT COMPOSITIONS (ASTM C150)

| ASTM type/name | Comp (%) | | | | Characteristics | Applications |
| --- | --- | --- | --- | --- | --- | --- |
| | $C_3S$ | $C_2S$ | $C_3A$ | $C_4AF$ | | |
| I (Ordinary) | 42-65 | 10-30 | 0-17 | 6-18 | no special requirements | general construction (e.g., sidewalks) |
| II (Modified) | 35-60 | 15-35 | 0-8 | 6-18 | moderate sulfate resistance, moderate heat of hydration | drainage systems, sea walls, floor slabs, foundations |
| III (High-early-strength) | 45-70 | 10-30 | 0-15 | 6-18 | higher strength soon after pouring | cold-weather construction |
| IV (Low-heat) | 20-30 | 50-55 | 3-6 | 8-15 | low heat of hydration | massive structures (e.g., dams) |
| V (Sulfate-resistant) | 40-60 | 15-40 | 0-5 | 10-18 | high sulfate resistance | foundations in high-sulfate soils |

It is noted that the above compositions are provided for illustrative purposes only, and are not intended to limit the present disclosure, as other cement/concrete/beton compositions have also been considered for the matrix composition.

The cylindrical bodies composed of tungsten disulfide ($WS_2$), which are also referred to as nanologs 100, that provide the dispersed phase in the matrix of the composite material have been described above with reference to FIGS. 1-9. Therefore, the above description regarding the composition, geometry, and method of making the nanologs 100 described with reference to FIGS. 1-9 is applicable to providing the dispersed phase of composite building material including the matrix of concrete composition.

For example, each cluster of cylindrical bodies, i.e., nanolog 100, can have a width dimension ranging from 0.2 microns to 3.0 microns (in some examples ranging from 0.3 microns to 2.0 microns), and a length greater than 5.0 microns. Each of the cylindrical bodies can have a width dimension ranging from 1 nm to 100 nm. Additionally, each cluster, i.e., nanolog 100, can contain between 2 and 200 cylindrical bodies. Further, the cylindrical bodies can a hollow core across their entire length, or the cylindrical body can have a solid core in at least one portion of the cylindrical body's length. The solid core may be comprised of an oxide containing composition. Embodiments have also been contemplated in which the dispersed phase includes a combination of solid and hollow core structures.

In some embodiments, the dispersed phase composition, e.g., nanologs 100, is present in the matrix composition, e.g., concrete composition, in an amount ranging from 0.05 wt. % to 5 wt. %. In other embodiments, the dispersed phase composition, e.g., nanologs 100, is present in the matrix composition, e.g., concrete composition, in an amount ranging from 0.15 wt. % to 1 wt. %. In other examples, the dispersed phase composition, e.g., nanologs 100, is present in the matrix composition, e.g., concrete composition, in an amount equal to 0.05 wt. %, 0.10 wt. %, 0.15 wt. %, 0.20 wt. %, 0.25 wt. %, 0.30 wt. %, 0.35 wt. %, 0.40 wt. %, 0.45 wt. %, 0.50 wt. %, 0.55 wt. %, 0.60 wt. %, 0.65 wt. %, 0.70 wt. %, 0.75 wt. %, 0.80 wt. %, 0.85 wt. %, 0.90 wt. %, 0.95 wt. % and 1.0 wt. %, or any value between any of the foregoing values, as well as any range of dimensions using one of the aforementioned values as a minimum value for the range and one of the aforementioned values as a maximum for the range. In some embodiments, to provide that the dispersed phase composition, e.g., nanologs 100, is present in the matrix composition, e.g., concrete composition, the nanologs 100 may be treated with a dispersant, such as a protein based dispersant, such as β-lactoglobulin (P90%, Sigma-Aldrich). Treating the nanologs 100 with the dispersant can include mixing the nanologs 100 with deionized water (6.0 mg/ml) containing β-lactoglobulin (2.0 mg/ml), in which the solution can that be bath-sonicated (Elma, model S10; 30 W, 37 kHz, Singen) for 30 min (540 J). The surface treated nanologs may then be mixed with the concrete composition. Further details regarding the surface treatment of the nanologs 100 with the protein based dispersant, e.g., β-lactoglobulin, can be found in the publication to Roey Nadiv et al., "$WS_2$ Nanotube-reinforced cement: dispersion matters", Construction and Building Materials, 98 (2015) pp. 112-118, which is incorporated in its entirety by reference. In some embodiments, nanologs can be added to the cement composition as dry powder.

In some embodiments, the matrix of the cement composition including the first dispersed phase of the nanologs 100 may include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC) and graphite platelets. The second dispersed phase of carbon containing materials could be used for reinforcement or in order to obtain the desired physical, chemical or mechanical properties.

Polymeric Reinforcement

In one embodiment, the nanologs 100, cylindrical bodies of tungsten disulfide ($W_2S$), that have been described above with reference to FIGS. 1-8 and 14-17 and 19-22 may be used in polymer materials for mechanical reinforcement. In some embodiments, the methods and structures disclosed herein provide a composite that includes a dispersed phase material of clusters of substantially cylindrical bodies comprising tungsten (W) and sulfur (S) that is present in a polymeric matrix. Each of the cylindrical bodies may have a geometry with at least one dimension that is in the nanoscale. For example, each cluster of cylindrical bodies can have a width dimension ranging from 0.2 microns to 3.0 microns (and in some examples ranging from 0.3 microns to 2 microns), and a length greater than 5.0 microns. The polymer matrix may have a composition selected from the group consisting of elastomers, epoxies, thermoplastic polymers, polyamides, polyphthalamide, polyphthalamide blend, poly-amide-imide, polyethylene, cross-linked polyethylene, polyester, polyurethanes, polyproplenes, RTV (room temperature vulcanization) silicones and combinations thereof.

In one example, the matrix phase is provided by an elastomer. An elastomer is a cross-linked, amorphous polymer when above its glass transition temperature. Each of the monomers, which link to form the polymer in an elastomer is usually made of carbon, hydrogen, oxygen and/or silicon. At ambient temperatures, elastomers are relatively soft, e.g., E=3 MPa, and deformable. Elastomers are usually thermosets (requiring vulcanization), but may also be thermoplastic. The long polymer chains cross-link during curing, i.e., vulcanizing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Examples of elastomers that are suitable for use with the present disclosure include unsaturated rubbers that can be cured by sulfur vulcanization, which include, but are not limited to: natural polyisoprene: cis-1,4-polyisoprene natural rubber (NR) and trans-1,4-polyisoprene gutta-percha; synthetic polyisoprene (IR for Isoprene Rubber); polybutadiene (BR for Butadiene Rubber); chloroprene rubber (CR), polychloroprene, neoprene, baypren etc; butyl rubber (copolymer of isobutylene and isoprene, IIR); halogenated butyl rubbers (chioro butyl rubber: CIIR; bromo butyl rubber: BIIR); styrene-butadiene rubber (copolymer of styrene and butadiene, SBR); nitrile rubber (copolymer of butadiene and acrylonitrile, NBR)(also called Buna N rubbers); hydrogenated nitrile rubbers (HNBR); therban; and zetpol.

In another embodiment, examples of elastomers that are suitable for use with the present disclosure include saturated rubbers that cannot be cured by sulfur vulcanization, which include, but are not limited to: EPM (ethylene propylene rubber, a copolyrner of ethylene and propylene) and EPDM rubber (ethylene propylene diene rubber, a terpolymer of ethylene, propylene and a diene-component); Epichlorohydrin rubber (ECO); Polyacrylic rubber (ACM, ABR); Silicone rubber (SI, Q, VMQ); Fluorosilicone Rubber (FVMQ); Fluoroelastomers (FKM, and FEPM) Viton, Tecnoflon, Fluorel, Aflas and Dai-El; Perfluoroelastomers (FFKM) Tecnoflon PFR, Kalrez, Chernraz, Perlast; Polyether block amides (PEBA); Chiorosulfonated polyethylene (CSM); Ethylene-vinyl acetate (EVA) and combinations thereof.

Other types of elastomers that are suitable for use with the present disclosure include thermoplastic elastomers (TPE); the proteins resilin and elastin; and polysulfide rubber.

In some embodiments, when an elastomer serves as the matrix of a composite having a dispersed phase of nanologs 100, i.e., clusters of cylindrical bodies of tungsten disulfide ($W_2S$), the mechanical properties of the composite are greater than the elastomer by itself. For example, the mechanical properties are enhanced, e.g., the slope of the stress-strain curve is increased, in comparison to the elastomer.

Composites including elastomers in accordance with the present disclosure may be used in sealing engagement applications, such as gaskets, vehicle tires, pump housing, anti-vibration mountings, etc.

In another embodiment, the polymer that is selected for the matrix of the composite may be an epoxy. Epoxies are typically thermosets. Epoxy resins, also known as polyepoxides are a class of reactive prepolymers and polymers which contain epoxide groups. Epoxy resins may be reacted (cross-linked) either with themselves through catalytic homopolymerisation, or with a wide range of co-reactants including polyfunctional amines, acids (and acid anhydrides), phenols, alcohols and thiols. These co-reactants are often referred to as hardeners or curatives, and the cross-linking reaction is commonly referred to as curing. Epoxy compositions that are suitable for use with the present disclosure may include bisphenol A epoxy resin, bisphenol F epoxy resin, novolac epoxy resin, aliphatic epoxy resin, glycidylamine epoxy resin and combinations thereof. One example of the repeating unit for an epoxy that is suitable for use with the present disclosure is a diglycidyl ether of bisphenol A, DGEPA, as follows:

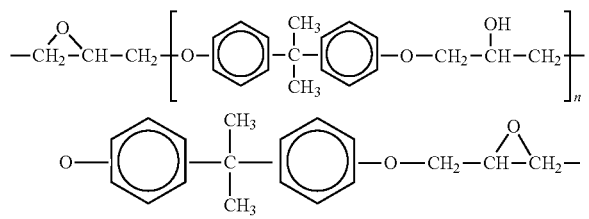

In some embodiments, when an epoxy serves as the matrix of a composite having a dispersed phase of nanologs 100, i.e., clusters of cylindrical bodies of tungsten disulfide ($W_2S$), the mechanical properties of the composite greater than the mechanical epoxy by itself. For example, the peel strength and shear strength performance of a composite of epoxy and the nanologs 100, i.e., clusters of cylindrical bodies of tungsten disulfide ($W_2S$), is greater than the peel strength and shear strength performance of the epoxy by itself. In some embodiments, the inclusion of the dispersed phase of nanologs 100 can double the peel strength and shear strength performance of the composite when compared to the epoxy. Energy absorbance, as indicated from the area under the stress-strain curve (e.g. of a tensile test according to ASTM D638) is also increased when compared to epoxy. Impact strength is also increased. Applications for composites including an epoxy based matrix and a dispersed phase of nanologs 100, i.e., clusters of cylindrical bodies of tungsten disulfide ($W_2S$), include adhesives, in addition to structures that employ the epoxy as the matrix of the structures body.

Hardeners for use with the disclosed epoxies may include amine hardeners, such as Jeffamine T-403, TETA, HY 955; amide hardeners, such as Versamide V-x series; sulfide hardeners, such as Capcure 3-800, LP-x series; anhydride hardeners; and accelerators, such as Epon DMP-x series. The above noted hardners are typically suitable for DGEBA. Other hardeners based on a variation of amines may be employed in the epoxy systems.

In another embodiment, the polymer may be a thermoplastic material, such as polyether ether ketone (PEEK) and polypropylene (PP). PEEK polymers are obtained by step-growth polymerization by the dialkylation of bisphenolate salts. When PEEK is employed as the matrix of a composite material including a dispersed phase of nanologs 100, i.e., clusters of cylindrical bodies of tungsten disulfide ($W_2S$), the mechanical properties of the composite are greater than the mechanical properties of PEEK without the dispersed phase of inorganic materials. For example, the Young's modulus may be doubled by the inclusion of the dispersed phase of nanologs 100 into a matrix of PEEK. Impact strength is also increased.

Applications for PEEK in accordance with the present disclosure include medical implants, aerospace structures, automotive structures, bearings, piston parts, pumps, compressor plate valves, and cable insulation.

Polypropylene (PP) is an addition reaction mechanism polymer made from the monomer propylene. Low-density polyethylene (LDPE) and high-density polyethylene (HDPE) are both suitable for use with the present disclosure. PP may be suitable for use as the matrix phase of a composite in accordance with the present disclosure, and is suitable for use in automotive and aerospace applications.

Automotive applications for composites including polypropylene, such as LDPE and HDPE, may include bumpers, fuel lines, door panels and fenders. PP may also be suitable for shielding piping and wire cable sheathing applications. The mechanical properties and impact strength of PP is increased by incorporation of a dispersed phase of nanologs 100, i.e., clusters of cylindrical bodies of tungsten disulfide ($W_2S$).

In another embodiment, the polymer for the matrix for the composite may be a polyamide. A polyamide is a polymer containing monomers of amides joined by peptide bonds. An amide group has the formula —$CONH_2$. An amide link has this structure:

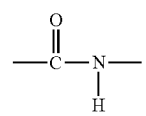

The polyamide polymer may have a high crystallinity, a low crystallinity or may be amorphous. Polyamide polymers that are suitable for use with the present disclosure may be homopolymers or copolymers. The polyamide polymers may aliphatic, semi aromatic, aromatic or a combination thereof.

In one embodiment, the polyamide used for the matrix phase of the polymer composite may be nylon. Nylon may be an aliphatic polymer. In nylon, the repeating units contain chains of carbon atoms. There are various different types of nylon depending on the nature of those chains. Examples of nylons that may be suitable for use as the base material layer of the coating may include nylon-6,6; nylon-6; nylon-6,9; nylon-6,10; nylon-6,12; nylon-11; nylon-12 and nylon-4,6. The repeating unit for nylon-6 is as follows:

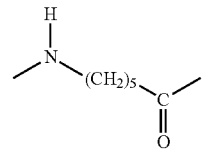

The repeating unit for nylon 6-6 is as follows:

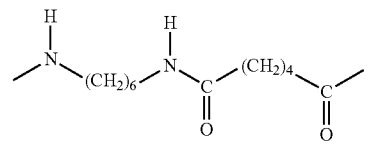

In some embodiments, nylons are condensation copolymers formed by reacting equal parts of a diamine and a dicarboxylic acid, so that amides are formed at both ends of each monomer in a process analogous to polypeptide biopolymers. Chemical elements included are carbon, hydrogen, nitrogen, and oxygen.

In another embodiment, the polyamide for the matrix phase of the polymer composite is kevlar. Kevlar is similar in structure to nylon-6,6 except that instead of the amide links joining chains of carbon atoms together, they join benzene rings.

In another embodiment, the polyamide used for the matrix phase of the composite may be polyphthalamide (aka. PPA, High Performance Polyamide). PPA is a thermoplastic synthetic resin of the polyamide (nylon) family. PPA's are polyamides containing aromatic rings in their backbones, which gives them high mechanical strength and thermal resistance. The term PPA is used when 60% or more moles of the carboxylic acid portion of the repeating unit in the polymer chain is composed of a combination of terephthalic (TPA) and isophthalic (IPA) acids. PPA's may be a semi-crystalline material composed from a diacid and a diamine. PPA is typically formed by the reaction of aromatic acids with aliphatic diamines. In some embodiments, the diacid portion contains at least 55% terephthalic acid (TPA) or isophthalic acid (IPA). Molar masses for PPA's made with direct polycondensation techniques range between 12,000 and 16,000 g/mol.

In another embodiment, the polyamide used for the matrix phase of the composite may be a polyphthalamide blend. For example, the matrix of the composite may be composed of at least one of polyphthalamide/polyamide blends and polyphthalamide/polyamide/polyolefin blends.

Other polyamides that are suitable for use as the matrix material of the composite include polyvinyl chloride (PVC), polyester (PES), polyethermide (PEI) and polyphenylene sulfide (PPS).

In some embodiments, the matrix phase of the composite may be provided by polyamide-imides. The polyamide-imides may be thermosetting or thermoplastic amorphous polymers. Polamide-imide polymers include a polymer chain that comprises amide linkages alternating with imide linkages. The mer unit for one example of a polyamide-imide used in accordance with the present disclosure is as follows:

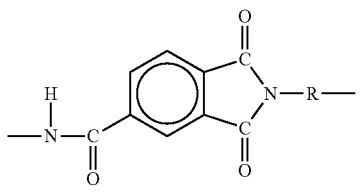

Polyamide-imides may be made from isocyanates and TMA (trimellic acid-anhydride) in N-methylpyrrolidone (NMP). For example, one route to the formation of polyamide-imides is the condensation of an aromatic diamine, such as methylene dianiline (MDA) and trimellitic acid chloride (TMAC). Reaction of the anhydride with the diamine produces an intermediate amic acid. The acid chloride functionality reacts with the aromatic amine to give the amide bond and hydrochloric acid (HCl) as a by-product. In the commercial preparation of polyamideimides, the polymerization is carried out in a dipolar, aprotic solvent such as N-methylpyrrolidone (NMP), dimethylacetamide (DMAC), dimethylformamide (DMF), or dimethylsulfoxide (DMSO) at temperatures between 20-60° C. The byproduct hydrochloric acid (HCl) is typically neutralized in situ or removed by washing it from the precipitated polymer. In another example, polyamide-imides may be formed by reacting diisocyanate, often 4,4'-methylenediphenyldiisocyanate (MDI), with trimellitic anhydride (TMA). Poly-amide-imides that are suitable for the methods and structures disclosed herein may be available from Solvay Advanced Polymers under the trademark Torlon, such as Torlon 4301, Torlon ai-10, Torlon ai-10 LM or Torlon 4000. Polyamide-imides (PAI) may be used in conjunction with fluoropolymers.

In some embodiments, the matrix material of the composite may be provided by polyethylene (PE). The term polyethylene describes a family of resins obtained by polymerizing ethylene gas, $H_2C=CH_2$. In some examples, low density polyethylene typically has a density value ranging from 0.91 to 0.925 g/cm$^3$, linear low density polyethylene is in the range of 0.918 to 0.94 g/cm$^3$, while high density polyethylene ranges from 0.935 to 0.96 g/cm$^3$ and above.

In another embodiment, the matrix material of the composite may be cross-linked polyethylene (PEX). Typically, PEX is made from high density polyethylene (HDPE). Cross linked polyethylene (PEX) contains cross-linked bonds in the polymer structure, changing the thermoplastic to a thermoset. In one embodiment, in order to be classified as being cross linked polyethylene (PEX), the required degree of cross-linking, according to ASTM Standard F 876-93, is between 65% and 89%.

In yet another embodiment, the polymer for the composite may be a polyester. Polyester is a category of polymers which contain the ester functional group in their main chain. In some examples, polyester that is suitable for the composite may include polybutylene terephthalate (PBT) and polyethylene terephthalate (PET). The repeating unit of polybutylene terephthalate (PBT) is as follows:

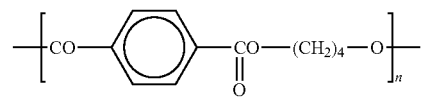

Polybutylene Terephthalate

The repeating unit of polyethylene terephthalate (PET) is as follows:

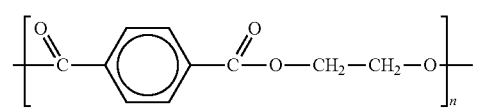

Polyesters are synthesized by reacting an organic acid, in this case terephthalic acid, with an alcohol. In the case of polybutylene terephthalate (PBT), the alcohol is generically referred to as butylene glycol, while in polyethylene terephthalate (PET) it is ethylene glycol. The resulting polymers are known, therefore, as polybutylene terephthalate (PBT) and polyethylene terephthalate (PET).

Other polymers that are suitable for use as the matrix phase of the composite include polyvinyl chloride (PVC), polyester (PES), polyamides (PA), polyethermide (PEI) and polyphenylene sulfide (PPS). PVC is suitable for shielding and piping applications. PES is suitable for use in fiber and textile applications; and PA is suitable fibers, toothbrush bristles, and car engine moldings. PEI and PPS are high temperature polymers. The structural properties of PVC, PES, PA, PEI and PPS may all be enhanced by incorporation of a dispersed phase of inorganic material having a metal chalcogenide composition with a fullerene-like (with and/or without a sectioned outer layer) or tubular-like geometry, in accordance with the present disclosure.

The cylindrical bodies composed of tungsten disulfide ($WS_2$), which are also referred to as nanologs 100, that provide the dispersed phase in the matrix of the polymeric composite material have been described above with reference to FIGS. 1-9. Therefore, the above description regarding the composition, geometry, and method of making the nanologs 100 described with reference to FIGS. 1-9 is applicable to providing the dispersed phase of composite polymeric material.

For example, each cluster of cylindrical bodies, i.e., nanolog 100, can have a width dimension ranging from 0.3 microns to 2.0 microns, and a length greater than 5.0 microns. Each of the cylindrical bodies can have a width dimension ranging from 1 nm to 100 nm. Additionally, each cluster, i.e., nanolog 100, can contain between 10 and 200 cylindrical bodies. Further, the cylindrical bodies can a hollow core across their entire length, or the cylindrical body can have a solid core in at least one portion of the cylindrical body's length. The solid core may be comprised of an oxide containing composition. Embodiments have also been contemplated in which the dispersed phase includes a combination of solid and hollow core structures.

In some embodiments, the clusters of the cylindrical bodies composed of tungsten disulfide ($WS_2$), which are also referred to as nanologs 100, may be present in the polymer matrix in an amount greater than 0.01% by volume. In some embodiments, the clusters of cylindrical bodies composed of tungsten disulfide ($WS_2$), i.e., nanologs 100, may be present in the polymer matrix in an amount ranging from 0.1 wt % to 60 wt. %. In another embodiment, the clusters of cylindrical bodies composed of tungsten disulfide ($WS_2$), i.e., nanologs 100, may be present in the polymer matrix in an amount ranging from 0.1 wt. % to 20 wt. %. In yet another embodiment, the clusters of cylindrical bodies composed of tungsten disulfide ($WS_2$), i.e., nanologs 100, may be present in the polymer matrix in an amount ranging from 0.1 wt % to 10 wt. %.

In some embodiments, the composite structure may further include a second dispersed phase of a carbon containing material, such as carbon nanotubes, e.g., single wall carbon nanotubes (CNT) or multi-wall carbon nanotubes (SWNT), or graphitic materials, such as carbon black (CB), graphitic fibers, diamond like carbon (DLC). The second dispersed phase of carbon containing materials could be used in polymer matrices for reinforcement or in order to obtain desired physical, chemical or mechanical properties.

The process of obtaining homogeneous mix of the clusters of the cylindrical bodies composed of tungsten disulfide ($WS_2$), i.e., nanologs 100, with carbon containing materials may begin with premixing the inorganic material having the metal chalcogenide composition and the fullerene-like (with and/or without a sectioned outer layer) and/or tubular-like geometry with the carbon containing material. In one embodiment, the premixing step may be done by dry mixing. In another embodiment, the premixing step may employ a solvent as a mixing media, such as alcohol. Examples of mixing media that are suitable for mixing the clusters of the cylindrical bodies composed of tungsten disulfide ($WS_2$), i.e., nanologs 100, with the carbon containing materials include an alcohol, such as methyl alcohol, ethyl alcohol, isopropyl alcohol, propanol, butanol, hexanol, heptanol, octanol, ethylene glycol, glycerol and combinations thereof. In another embodiment, the mixing media may be an inert solvent. It is noted that the carbon containing materials may be omitted from the aforementioned premixture.

The polymer may then be added to the premixture of the clusters of cylindrical bodies composed of tungsten disulfide ($WS_2$), i.e., nanologs 100, with carbon containing materials. The polymer may be any precursor for providing the above described polymer compositions. In some examples, the monomer/polymer may be selected from the group consisting of ethylene, propylene, homopolymers, copolymers thereof with alpha-olefins, conjugated alpha-diolefins, styrene, cycloalkenes, norbornene, norbornadiene, cyclopentandiene, elastomer type of polymer and mixtures thereof. Mixing procedures could be conducted using at least one of high shear mixers, two or three roll mixers, homogenizers, bead mills, ultrasonic pulverizer, ribbon blender, v blender, continuous processor, cone screw blender, double planetary, counter-rotating, vacuum mixer, dispersion mixer, magnetic stirrers and variations thereof in combination with or without elevated temperature to the value of polymer melting point. In some embodiments, when alcohol is used as a mixing media, it should be evaporated prior to adding the polymer. The mixture may then be fed into an extruder to the form the polymer.

In one example, the clusters of cylindrical bodies composed of tungsten disulfide ($WS_2$), i.e., nanologs 100, may be incorporated into the thermoplastic polymer, e.g., nylon, PE, PP, to improve the polymers mechanical properties (e.g. toughness), and/or its tribological properties. These materials can be used either as matrices in composites, and as stand-alone polymers.

The product may be provided as a granulated compound containing the clusters of cylindrical bodies composed of tungsten disulfide ($WS_2$), i.e., nanologs 100, inside a matrix of thermoplastic polymers, e.g., nylons, PE, PP. The compounding can be provided by direct mixing of powder including the cylindrical bodies composed of tungsten disulfide ($WS_2$), i.e., nanologs 100, with twin-screw extruder. In another example, the compounding can be achieved by dispersion in a plasticizer compatible to the polymer by high shear mixer or stirred bead mill, and then incorporation to the compound by twin-screw extruder.

Extrusion is only one way to form a composite product in accordance with the present disclosure. For example, composite structures may be formed using molding methods. In one example, a composite structure including a polymeric matrix and a dispersed phase of the clusters of the cylindrical bodies composed of tungsten disulfide ($WS_2$), i.e., nanologs 100, may be formed using injection molding. In injection molding, a composite precursor including the polymeric matrix and the dispersed phase is melted and forced into a mold cavity. The mold cavity has the geometry for the composite structure. Once cooled, the melted composite precursor solidifies in the form of the geometry defined by the mold, and the mold can be removed. In another embodiment, the composite structure may be formed using blow molding. Blow molding is like injection molding except that hot liquid precursor composite material pours out of a barrel vertically in a molten tube. The mold closes on it, and forces it outward to conform to the inside shape of the mold. When it is cooled, a hollow geometry is formed for the composite structure. In another embodiment, the composite product of the polymer matrix and the dispersed phase of the cylindrical bodies composed of tungsten disulfide ($WS_2$), i.e., nanologs 100, may be formed using compression molding. In this type of plastic molding, a slug of hard plastic, i.e., slug of solidified composite precursor including the polymeric matrix and the dispersed phase is pressed between two heated mold halves. Compression molding usually uses vertical presses instead of the horizontal presses used for injection and blow molding. The parts of the composite material that are formed are then air-cooled. In other examples, composite parts may be formed using rotational molding, structural foam molding, thermoforming, film insert molding, gas assist molding and combinations thereof. In some examples, composite polymers may be part of ink for 3D printing.

Catalysis

The catalyst materials of the present disclosure include clusters of cylindrical bodies composed of tungsten disulfide ($WS_2$), i.e., nanologs 100, that can be used as catalysts by themselves or as catalyst supports. Transition metal disulfides are widely used as catalysis for hydrodesulfurization (HDS) or hydrotreating, which is a catalytic chemical process widely used to remove sulfur from refined petroleum products. One purpose for removing the sulfur is to reduce the $SO_2$ emissions resulting from combustion of those products. Another purpose is to avoid poisoning of costly noble metal catalysts involved in oil refining. Refinery HDS feedstocks (naphtha, kerosene, diesel oil, and heavier oils) contain a wide range of organic sulfur compounds, including thiols, thiophenes, organic sulfides and disulfides, and many others. These organic sulfur compounds are products of the degradation of sulfur containing biological components, present during the natural formation of the fossil fuel, e.g., petroleum crude oil. The HDS processes using the catalyst and catalyst supports disclosed herein can desulfurize a refinery naphtha to remove the total sulfur down to the parts per million range, or lower in order to prevent poisoning the noble metal catalysts in the subsequent catalytic reforming of the naphthas. The HDS processes disclosed herein, which utilize nanologs 100 as the catalyst and/or catalyst support, meet the latest environmental regulations in the United States and Europe, requiring what is referred to as ultra-low-sulfur diesel (ULSD). For example, highway vehicle diesel prepared using HDS processes that utilize nanologs 100 as the catalyst and/or catalyst support can have a sulfur content within the range of 15 ppm to 30 ppm by weight, or less. In some examples, the catalyst structures disclosed herein can provide hydrodesulfurization (HDS) of thiophene and/or benzothiophene and/or dibenzothiophene. For example, HDS catalysts of the present disclosure are based on tungsten disulfide ($WS_2$) together with smaller amounts of other metals, such as palladium (Pd), Nickel (Ni) and Cobalt (Co).

In addition to the tungsten disulfide ($WS_2$) nanologs 100 serving as a catalyst by itself, i.e., without being coated with a catalytic promoting metal, such as nickel (Ni) or cobalt (Co), may also serve as a catalyst support. Successful catalysis supports typically maximize contact area between the catalyst and the reagents. It has been determined that nanologs 100 of $WS_2$, as described above with reference to FIGS. 1-8 and 14-17 and 19-22, have a surface area that is suitable as a catalyst support, and in accordance with the production methods described above may be manufactured in quantities suitable for commercial applications. For example, the surface area of the nanologs 100 providing the catalyst support may range from 5 $m^2g^{-1}$ to 150 $m^2$ $g^{-1}$. In another embodiment, the surface area of the nanologs 100 providing the catalyst support may range from 7 $m^2$ $g^{-1}$ to 11 $m^2$ $g^{-1}$. In yet another embodiment, the surface area of the nanologs 100 providing the catalyst support may range from 50 to 100. For example, nano-logs have even greater potential due to their stepped morphology (see FIG. 7).

It is noted that metals, such a cobalt (Co) and nickel (Ni), have a strong promoter catalytic effect. Nanologs 100 composed of tungsten disulfide ($WS_2$) can be employed for dehydrogenation and photocatalytic processes in both their pristine from, as well as covered with metal nano-particles, such as cobalt (Co) and nickel (Ni) nanoparticles. The metal nano-particles can be from 5 to 200 nm in diameter. In some embodiments, the nanologs 100, e.g., clusters of cylindrical bodies of tungsten disulfide ($W_2S$), that have been described above with reference to FIGS. 1-8 and 14-17 and 19-22 may be used in catalysis, for instance, in hydrogenation process ($HC+H_2 \rightarrow {}^iHC$, where ${}^iHC$ has more saturated bonds), hydrodesulfurization (HDS) processes which is a catalytic chemical process widely used to remove sulfur from refined petroleum products ($HC-SH \rightarrow {}^iHC+H_2S$) or as photocatalyst ($A+hv \rightarrow B$). HC stands for hydrocarbon and its derivatives. Transition metal disulfides are widely used for those purposes.

In some embodiments, a suitable catalysis support is to maximize contact area between catalyst and reagents. Typically, alumina has been used as a support. Nanologs 100, i.e., clusters of cylindrical bodies of tungsten disulfide ($W_2S$), each cluster of cylindrical bodies has a width dimension ranging from 0.2 microns to 3.0 microns (in some examples ranging from 0.3 microns to 2 microns), and a length greater than 5.0 microns, have very large surface area available for catalysis. In some embodiments catalytic performance can be achieved by nanologs used per se. In another embodiment nanologs can be pretreated by deposition of metal nanoparticles (Ni, Co etc. or their combination). In some embodiments catalytic activity of nanologs can be enhanced by presence of steps and/or grooves which are part of nanolog structure because structural and morphological irregularities serve as sinks for unsaturated coordination sites which are believed to play key role in catalytic process.

In some embodiments in which the nanologs 100 provide a catalytic support and is covered with cobalt (Co) containing nanoparticles, the cobalt containing metal nano-particles can be formed on the surface of the nanologs 100 by electroless plating. In some embodiments, the palladium (Pd) activated nanologs inserted into the electroless plating solution. The electroless plating process may begin with surface activation of the nanologs 100 by depositing palladium nanocrystals on the nanolog surface to create nucleation centers for the metal deposition. The metal nano-particles can be from 5 to 200 nm in diameter.

In one example, surface activation of the $WS_2$ nanologs was achieved by depositing Pd nanocrystallites onto the surface of the nanologs 100. It is noted that in some embodiments, that include nanologs having hollow structures, such as those depicted in FIGS. 3 and 6, the Pd nanocrystallites may be formed on the exterior surfaces of the nanologs 100, and the interior surface H1 inside the nanologs 100 assembly (see FIG. 6) i.e., exposed hollow surfaces. In some embodiments, the Pd nanocrystallite forming process creates nucleation centers for the subsequent metal deposition. In one example, to provide the Pd nanocrystallites a $SnCl_2/PdCl_2$ system used, in which the $WS_2$ nanologs 100 were immersed in an aqueous solution of $SnCl_2$ $2H_2O$ and HCl (e.g., 0.004/0.096 M, respectively) for sensitization and were ultrasonically agitated for a time period of 1 minute to 10 minutes, e.g., 5 minutes, at room temperature (RT), e.g., 20° C. to 25° C. The sensitized nanologs 100 were retrieved from the solution by centrifugation at 2700 rpm for 1.5 min, and re-immersed in de-ionized water (DI). Thereafter, the nanologs 100 were again retrieved by centrifugation, and were immersed, and ultrasonically agitated for 5 min at substantially room temperature in an aqueous solution of $PdCl_2$ and HCl (0.002/0.096 M, respectively), to create palladium catalytic nucleation sites onto the surface of the nanolog 100. Following formation of the catalytic nucleation sites, the nanologs 100 may be treated with another step of centrifugation, and rinsing in deionized water, and a repeated centrifugation may be performed to separate the Pd activated nanologs 100 from the solution and remove excess metal ions. It is noted that the above description of surface activation has been provided for illustrative purposes only, and is not intended to limit the present disclosure, as other surface activation methods are also within the scope of the present disclosure, so long as contributing to the formation of cobalt nanoparticles and/or nickel nanoparticles on the surface of the nanologs 100.

Following surface activation, e.g., the formation of Pd activated nanologs 100, the formation of the cobalt plated nanologs, i.e., cobalt plated nanolog catalyst supports, may continue with electroplating of cobalt. Electroplating may include a cobalt and sodium containing aqueous solution, such as Cobalt (II) chloride ($CoCl_2.6H_2O$) and sodium citrate ($Na_3C_6H_5O_7.2H_2O$) dissolved in deionized water and mixed. Reduction agents as DMAB (($CH_3)_2NH.BH_3$) and sodium hypophosphite ($NaH_2PO_2.H_2O$) can be added one after the other into the cobalt and sodium containing aqueous solution, i.e., Co ion containing solution. The pH of the solution may be adjusted to approximately 9.5, e.g., ranging from 9.0 to 10, by ammonia solution, and the temperature can be set to a value ranging from 60° C. to 80° C., e.g., 70° C. At this point, nanologs 100 activated with Pd nanocrystallites can be added to the suspension and maintained at a temperature ranging from 60° C. to 80° C., e.g., 70° C., for a time period ranging from 15 minutes to 30 minutes, e.g., 20 minutes. After deposition, the coated nanologs are sonicated for 5 min and only then retrieved from the Co solution, and rinsed by deionized water several times by centrifugation and dried by heating in vacuum.

It is noted that the above description of cobalt plating has been provided for illustrative purposes only, and is not intended to limit the present disclosure, as other surface activation methods are also within the scope of the present disclosure, so long as contributing to the formation of cobalt nanoparticles and/or nickel nanoparticles on the surface of the nanologs 100.

In yet another embodiment, the catalyst support may include a nickel (Ni) coating atop a nanolog 100 composed of tungsten disulfide ($WS_2$). Similar to the above description for forming the nanologs 100 having the cobalt (Co) coating, the catalyst supports having the nickel (Ni) coating may be treated for surface activation. For example, forming a nickel coating nanolog 100 may begin by depositing Pd nanocrystallites onto the surface of the nanologs 100. The above description of surface activation, e.g., depositing Pd nanocrystallites, onto the nanologs 100 before forming the cobalt (Co) coating is suitable for describing one embodiment of surface activation before forming a nickel (Ni) coating.

Electroplating nickel (Ni) on the activated surface may include inserting said the surface activated nanologs 100 in a solution containing nickel sulfate ($NiSO_4.6H_2O$) or nickel chloride ($NiCl_2.6H_2O$) and applying a reducing agent of sodium hypophosphite ($NaH_2PO_3.6H_2O$). The PH of the solution may range from 4 to 6, and the temperature may range from 70° C. to 100° C. for plating.

It is noted that the above electroplating process may be applied to the nanolog structures 100 depicted in FIGS. 3 and 6, in which cobalt may be deposited not only on the exterior surfaces of the nanologs 100, but on the interior surfaces of the nanologs 100, as well. The cobalt and/or nickel coating may be present on the interior surfaces of nanologs 100 assemblies that are entirely hollow, or nanologs that are partially hollow, i.e., partially hollow nanologs having a partial oxide core. The cobalt and/or nickel coating may be present on the interior surfaces of nanologs 100 assemblies shown on FIG. 6.

Figure 18:
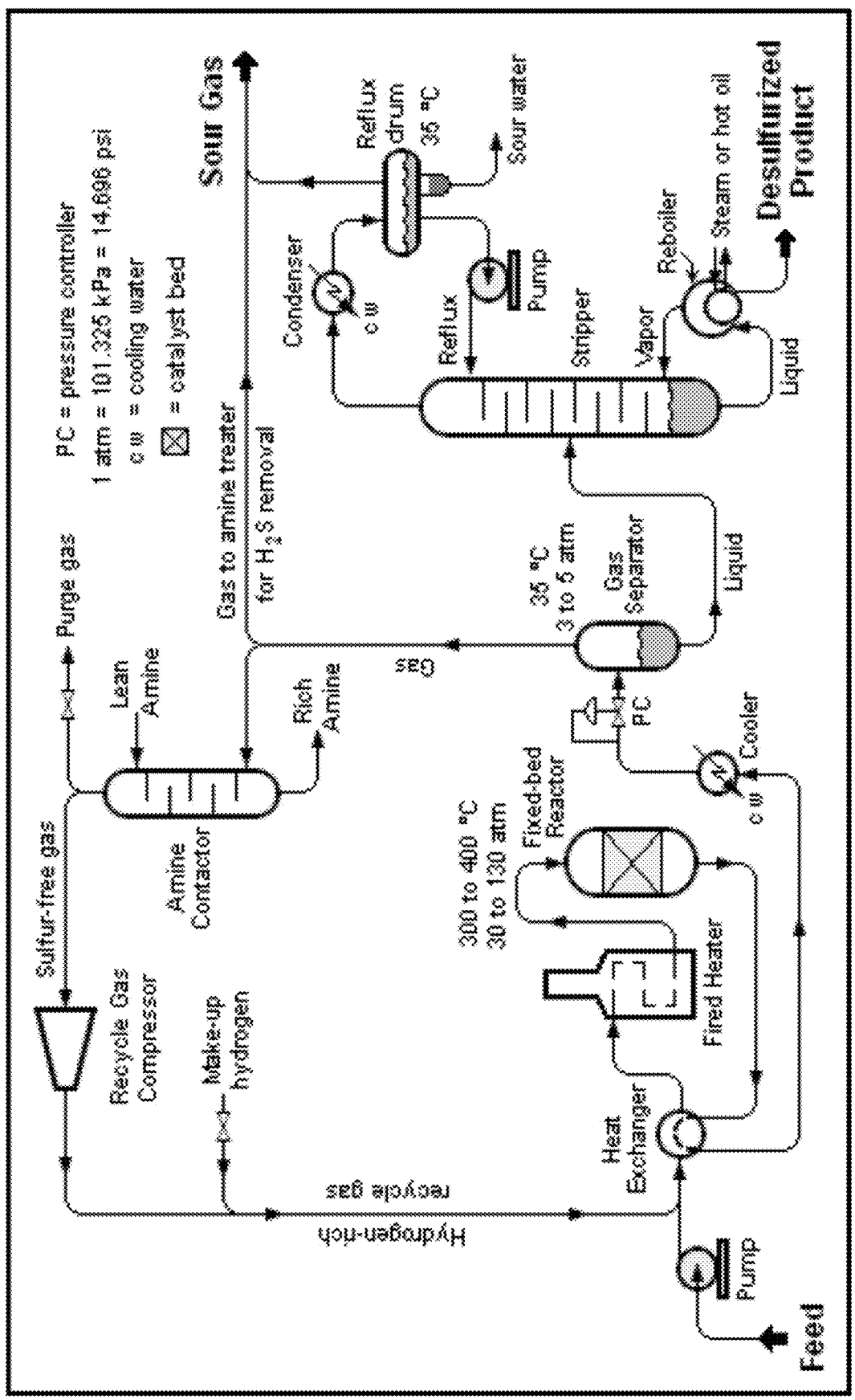
FIG. 18 is a schematic of a hydrodesulfurization unit that employs a catalyst of nanologs, in accordance with one embodiment of the present disclosure.

In some embodiments, the catalyst and catalyst supports provided by the methods disclosed herein may be used in the fluid bed of a hydrodesulfurization unit, as depicted in FIG. 18. In a hydrodesulfurization unit, such as in a refinery, the hydrodesulfurization reaction takes place in a fixed-bed reactor at elevated temperatures ranging from 300 to 400° C. and elevated pressures ranging from 30 to 130 atmospheres of absolute pressure, in the presence of a nanolog catalyst of $WS_2$, or nickel and/or cobalt coated catalyst support of $WS_2$ nanologs.

Referring to FIG. 18, the liquid feed (at the bottom left in the diagram) is pumped up to the required elevated pressure and is joined by a stream of hydrogen-rich recycle gas. The resulting liquid-gas mixture is preheated by flowing through a heat exchanger. The preheated feed then flows through a fired heater where the feed mixture is totally vaporized and heated to the required elevated temperature before entering the reactor and flowing through a fixed-bed of catalyst where the hydrodesulfurization reaction takes place. The hot reaction products are partially cooled by flowing through the heat exchanger where the reactor feed was preheated and then flows through a water-cooled heat exchanger before it flows through the pressure controller (PC) and undergoes a pressure reduction down to about 3 to 5 atmospheres. The resulting mixture of liquid and gas enters the gas separator vessel at about 35° C. and 3 to 5 atmospheres of absolute pressure.

Most of the hydrogen-rich gas from the gas separator vessel is recycle gas, which is routed through an amine contactor for removal of the reaction product $H_2S$ that it contains. The $H_2S$-free hydrogen-rich gas is then recycled back for reuse in the reactor section. Any excess gas from the gas separator vessel joins the sour gas from the stripping of the reaction product liquid. The liquid from the gas separator vessel is routed through a reboiled stripper distillation tower. The bottom product from the stripper is the final desulfurized liquid product from hydrodesulfurization unit.

The overhead sour gas from the stripper contains hydrogen, methane, ethane, hydrogen sulfide, propane, and, perhaps, some butane and heavier components. The sour gas is sent to the refinery's central gas processing plant for removal of the hydrogen sulfide in the refinery's main amine gas treating unit and through a series of distillation towers for recovery of propane, butane and pentane or heavier components. The residual hydrogen, methane, ethane, and some propane is used as refinery fuel gas. The hydrogen sulfide removed and recovered by the amine gas treating unit is subsequently converted to elemental sulfur in a Claus process unit or to sulfuric acid in a wet sulfuric acid process or in the conventional contact process.

It is noted that the above hydrodesulfurization unit is only one example of an apparatus that can employ the catalyst and catalyst supports provided by the methods disclosed herein. It is not intended that the present disclosure be limited to only this example.

Lithium Batteries

Battery electrodes (cathode 18 and anode 19) containing $WS_2$ nanologs can be made by dispersing nanologs with/without carbon black and polyvinylidene fluoride (PVDF) binder in dimethyl phthalate solvent to form a homogeneous slurry. The above description for dispersion provided for the above described composites, i.e., polymeric composites and concrete, is suitable for providing the description of dispersion for the nanologs used for forming electrodes. For example, dispersion can be a situation when 1/N (N=1,2,3, 4 . . . ) of admixed material's mass occupies 1/N (N=1,2,3, 4 . . . ) of matrix volume.

In some instances, the nanolog geometry, which can include a hollow core, or partially hollow core, can permit the diffusion of lithium (Li) through the nanolog, which provides for increased ion permeability for battery applications. The nanologs of the present disclosure may be integrated into an electrode material further including a carbon based material, such as graphite or carbon black, and a polymer, such as a fluoropolymer or sulfonated polyaniline, in which the electrode material is capable of intercalating (capture) of lithium ions and deintercalating (release) of lithium ions during an electrical charge-discharge cycle.

Figure 23:
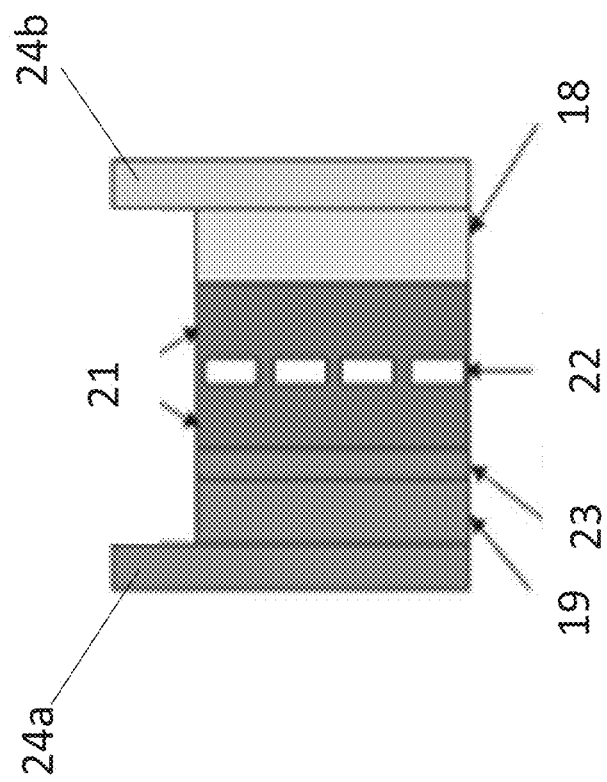
FIG. 23 is a schematic of a battery including at least one nanolog containing electrode in accordance with one embodiment of the present disclosure.

In some embodiments, the nanologs described herein may be included within an energy storage device, such as a battery, that includes a positive electrode, i.e., cathode 18, a negative electrode, i.e., anode 19, and an electrolyte 21, e.g., non-aqueous electrolyte, as depicted in FIG. 23. The electrolyte 21 can play a role in transporting the positive lithium ions between the electrodes, i.e., cathode 18 and anode 19. One example of an electrolyte 21 suitable for use with the electrodes of the present disclosure may be composed of a lithium salt, such as $LiPF_6$, in an organic solution. Other examples of electrolytes 21 that may be suitable for use with the batteries of the present disclosure include lithium bis (oxalato)borate, lithium difluoro(oxalato)borate, lithium hexafluoroarsenate (V), lithium hexafluorophosphate, lithium hexafluorophosphate solution in ethylmethyl carbonate, lithium hexafluorophosphate solution in dimethyl carbonate, lithium hexafluorophosphate solution in propylene carbonate, lithium perchlorate, lithium phosphate, lithium tetrachloroaluminate, lithium tetrachlorogallate, lithium tetrafluoroborat, lithium trifluoromethanesulfonate and combinations thereof.

At least one of the electrodes includes the nanologs. In one example, the cathode 18 may include the nanologs in a formulation including a polymer, such as a fluoropolymer and a carbon containing material, such as black carbon, graphene, carbon nanotubes or combination; and the anode 19 may be composed of graphite and not include the nanologs. The cathode 18 may include any of the above described nanologs. Therefore, the above nanologs, their composition, the geometry, method of formation and size, which has been described above, is applicable to the nanologs that may be used in the electrodes, e.g., cathode 18, of the battery. The polymer component of the cathode 18 may be selected from the group consisting of polyvinylidene fluoride, polytetrafluoroethylene, P(VDF-trifluoroethylene) copolymer, P(VDF-tetrafluoroethylene) copolymer, fluorinated ethylene-propylene, polyethylene-tetrafluoroethylene, perfluoropolyether, and combinations thereof. The carbon containing material of the cathode 18 is not limited to only carbon black, as carbon nanotubes, as well as graphene, may be used in combination with carbon black or may be substituted for carbon black.

In some embodiments, the nanologs may be present in the cathode in an amount ranging from 50 wt % to 90 wt. %, the polymeric component may range from 5 wt. % to 30 wt. %, and the carbon containing material of the cathode 18 may be present in an amount ranging from 5 wt. % to 50 wt. %. For example, in some embodiments, the nanologs may be present in a cathode 18 that comprises 50% graphene.

The anode 19 is typically composed of a carbonaceous material, but is not limited to only these types of materials.

Further, although some embodiments for the anode 19 do not include nanologs, in other embodiments, the anode 19 may include nanologs, as described above.

Referring to FIG. 23, the battery structure may further include a separator 22, and passivating layer 23, as well as current collectors 24a, 24b for both of the electrodes, i.e., cathode 18 and anode 19. The above described battery structure including nanolog containing electrodes can be coin cell tested. For this a slurry including the nanologs, polymeric component and carbon containing component was spread on a copper foil to provide coated electrodes. The coated electrodes were dried in a vacuum oven at 120° C. for 12 hours, and pressed to enhance the contact between the active materials, i.e., nanologs, and the conductive carbons. The coin cells are assembled in an argon-filled glove box using lithium metal foil as the counter electrode. The electrolyte used was 1 M $LiPF_6$ in a mixture of ethylene carbonate and dimethyl carbonate 1:1 by volume. The cells were galvanostatically discharged and charged in the voltage range of 0.01-3 V or higher.

The following examples are provided to further illustrate the present invention and demonstrate some advantages that arise therefrom. It is not intended that the invention be limited to the specific examples disclosed.

EXAMPLES

These following examples detail the stages involved in one embodiment for the preparation of clusters of cylindrical bodies composed of tungsten disulfide ($WS_2$), i.e., nanologs. FIGS. 14-17 are images of nanologs taken using a scanning electron microscope (SEM), in which the nanologs depicted were formed using the following procedure. Each of the following samples was formed using a method beginning with grinding coarse $WO_{2.9}$ to fine size so that 50% of the powder was below 1 μm with the most abundant grain size around 1 μm. The nanologs depicted in FIGS. 15, 16 and 17 were formed with a process using $WO_{2.9}$ as a precursor material, but the nanologs depicted in FIG. 14 were formed with a process using yellow tungsten oxide ($WO_3$) as a precursor material. Thereafter, the powder weighed and divided into a 10 gram sample increment, i.e., precursor material, which was loaded into the basket of the furnace (as depicted in FIG. 10). The temperature of the furnace was increased to 850° C. while streaming $N_2$ through the reaction chamber of the furnace with the precursor inside the basket. The precursor material was reacted with a mixture of $N_2/H_2/H_2S$ with ratio 1:2:2 for at least 1 hour. The gas flow flux was maintained below 57 cc/min $cm^2$ through reactor cross section. The nanologs depicted in FIG. 15 were formed with a process that reacted the precursor material with the mixture of $N_2/H_2/H_2S$ for 3 hours. The nanologs depicted in FIG. 17 were formed with a process that reacted the precursor material with the mixture of $N_2/H_2/H_2S$ for 2 hours. The nanologs depicted in FIG. 14 were formed with a process that reacted the precursor material with the mixture of $N_2/H_2/H_2S$ for 1 hour. The nanologs depicted in FIGS. 14, 15 and 17 had a solid core. The nanologs depicted in FIG. 16 where partially hollow, and had a reaction time greater than the other samples. To end the reaction the mixture of $N_2/H_2/H_2S$ was exchanged with $N_2$ gas. The reactor was allowed to cool to room temperature, e.g., approximately 20° C. and 25° C. The reaction product was removed from the furnace was spread using a moderate mechanical force. The powder was imaged using a scanning electron microscope to provide FIGS. 14-17.

Figure 14:
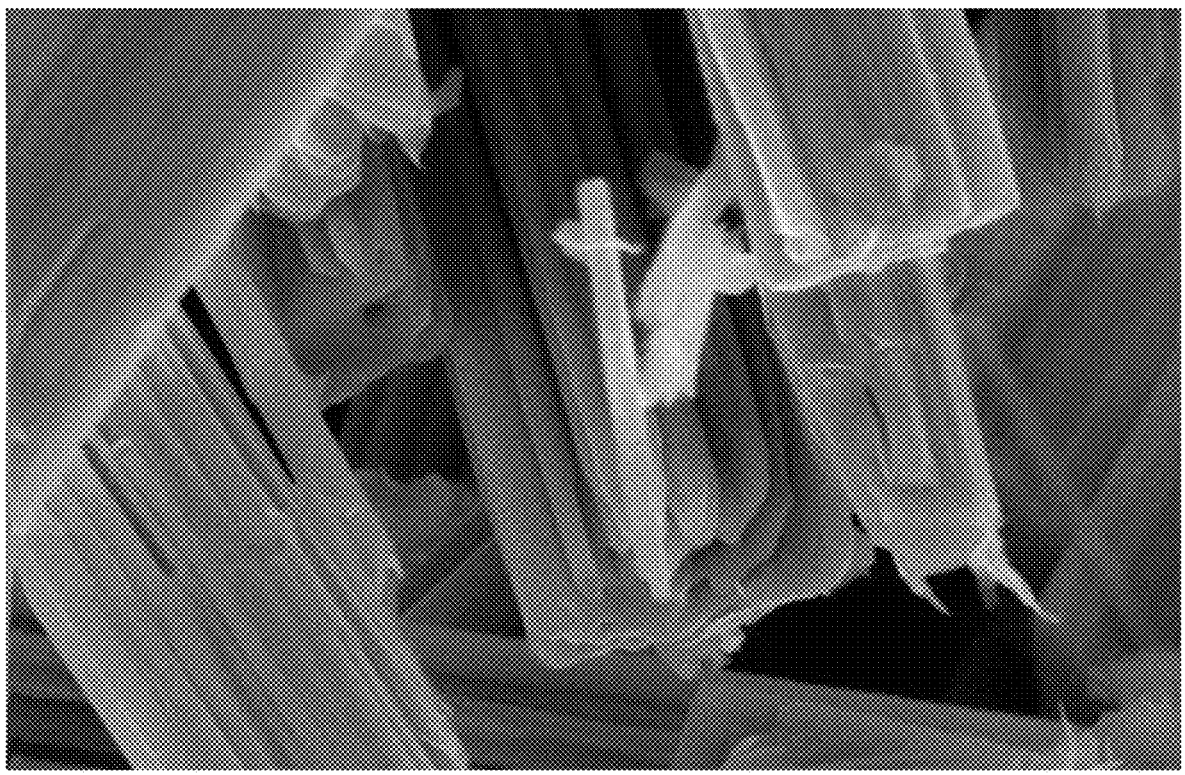
FIGS. 14-17 are scanning electron microscope (SEM) images of nanologs formed in accordance with one embodiment of the present disclosure.
Figure 15:
Figure 16:
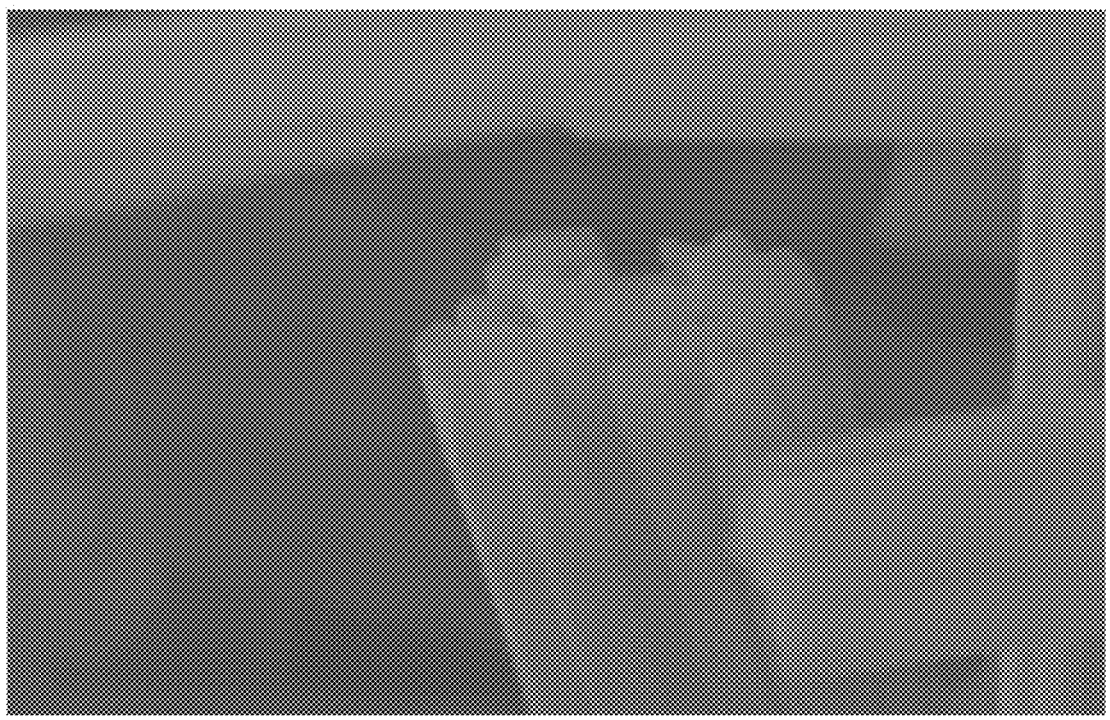
Figure 17:
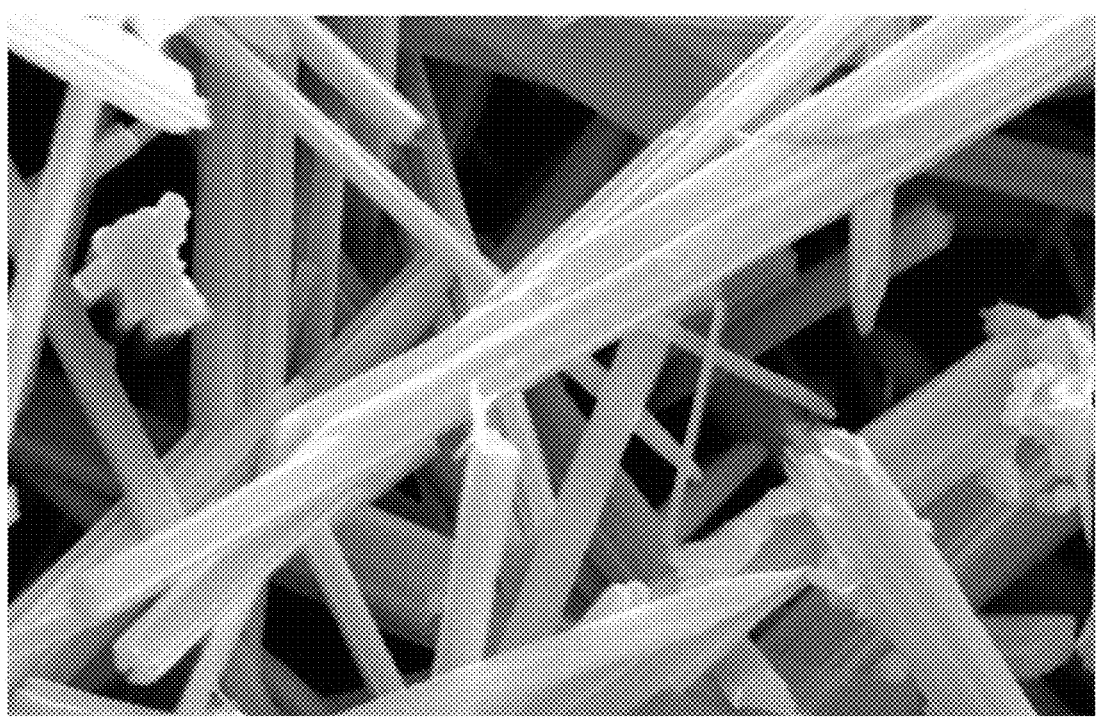

FIGS. 14, 15 and 17 depict nanologs, i.e., cylindrical bodies that are in a cluster and are substantially aligned with one another so that their lengths are substantially parallel. The composition of the cylindrical bodies comprises tungsten (W) and sulfur (S), i.e., tungsten disulfide ($WS_2$), and each of the cylindrical bodies has a geometry with at least one dimension that is in the nanoscale. Each cluster of cylindrical bodies may have a width dimension ranging from 0.3 microns to 2.0 microns, and a length greater than 5.0 microns.

Each of the nanologs included an oxide core. It was calculated that in order to remove the oxide core to provide nanologs having a hollow core, the reaction time would have to be increased to 6 hours or greater. The nanologs depicted in FIG. 16 had a core that was partially hollow.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A method of forming a nanostructure comprising:
   reducing a particle size of tungsten oxide powder to produce a precursor material having a reduced particle size of less than 2 microns, wherein said reducing the particle size comprises grinding coarse $WO_3$ to fine size so that 50% of the powder will be below 1 μm;
   heating the precursor material in a chamber to a reaction temperature in an inert atmosphere;
   introducing hydrogen sulfide containing gas into the chamber after the reaction temperature has been reached to provide reduction and sulfidization reactions with the precursor material to provide a sulfided reactant structure; and
   separating the sulfided reactant reaction into a powder containing clusters of cylindrical bodies composed of tungsten (W) and sulfur (S), wherein each of the cylindrical bodies has a geometry with at least one dimension that is in the nanoscale, and said each cluster of cylindrical bodies may have a width dimension ranging from 0.2 microns to 5.0 microns, and a length greater than 5.0 microns.

2. The method of claim 1, wherein said reducing the particle size comprises grinding coarse $WO_3$ to said fine size so that 50% of the powder will be below 1 μm with a majority grain size being around 1 μm.

3. The method of claim 1, wherein the reduced particle size is selected to provide a dimension for the clusters of cylindrical bodies.

4. The method of claim 3, wherein heating the precursor material to the reaction temperature includes increases of a temperature of the chamber from ambient to said reaction temperature ranging from 750° C. to 950° C. while streaming a nitrogen gas ($N_2$) atmosphere through the chamber at atmospheric pressure.

5. The method of claim 1, wherein said introducing hydrogen sulfide containing gas into the chamber after the reaction temperature has been reached comprises exchanging the nitrogen gas atmosphere with an atmosphere comprising 30% to 50% hydrogen sulfide ($H_2S$) gas, and 30% to 50% hydrogen ($H_2$) gas.

6. The method of claim 5, wherein said introducing hydrogen sulfide containing gas into the chamber comprises a mixture of $N_2/H_2/H_2S$ with ratio 1:2:2 for at least 1 hour.

7. The method of claim 5, wherein the time period of said introducing hydrogen sulfide containing gas is selected to provide an oxide core within the cylindrical bodies, or to provide a hollow core within the cylindrical bodies.

8. A method of claim 5, wherein forming the precursor material comprises:
   reducing a particle size of $WO_3$ powder to produce a $WO_3$ precursor material having a reduced particle size of less than 2 microns;
   heating the precursor material in a chamber to a reaction temperature ranging from 400° C. to 700° C. in an inert atmosphere;
   introducing a reaction atmosphere including 5% to 45% hydrogen gas and 55% to 95% nitrogen gas into the chamber after the reaction temperature has been reached for a reaction time of less than 1 hour, wherein the $WO_3$ precursor material is converted to a reaction product of $WO_{2.9}$; and
   separating the reaction product of $WO_{2.9}$ into a powder containing nanospheres composed of $WO_{2.9}$.

9. The method of claim 8, wherein the reduced particle size is greater than 0.3 microns.

10. The method of claim 8, wherein the reaction temperature ranges from 500° C. to 600° C.

11. A method of forming a nanostructure comprising:
    reducing a particle size of tungsten oxide powder to produce a precursor material having a reduced particle size of less than 2 microns, wherein the reduced particle size is selected to provide a dimension for the clusters of cylindrical bodies;
    heating the precursor material in a chamber to a reaction temperature in an inert atmosphere;
    introducing hydrogen sulfide containing gas into the chamber after the reaction temperature has been reached to provide reduction and sulfidization reactions with the precursor material to provide a sulfided reactant structure; and
    separating the sulfided reactant reaction into a powder containing clusters of cylindrical bodies composed of tungsten (W) and sulfur (S), wherein each of the cylindrical bodies has a geometry with at least one dimension that is in the nanoscale, and said each cluster of cylindrical bodies may have a width dimension ranging from 0.2 microns to 5.0 microns, and a length greater than 5.0 microns.

12. A method of forming a nanostructure comprising:
    reducing a particle size of tungsten oxide powder to produce a precursor material having a reduced particle size of less than 2 microns;
    heating the precursor material in a chamber to a reaction temperature in an inert atmosphere;
    introducing hydrogen sulfide containing gas into the chamber after the reaction temperature has been reached to provide reduction and sulfidization reactions with the precursor material to provide a sulfided reactant structure, wherein said introducing hydrogen sulfide containing gas into the chamber after the reaction temperature has been reached comprises exchanging the nitrogen gas atmosphere with an atmosphere comprising 30% to 50% hydrogen sulfide ($H_2S$) gas, and 30% to 50% hydrogen ($H_2$) gas, wherein said introducing hydrogen sulfide containing gas into the chamber comprises a mixture of $N_2/H_2/H_2S$ with ratio 1:2:2 for at least 1 hour; and
    separating the sulfided reactant reaction into a powder containing clusters of cylindrical bodies composed of tungsten (W) and sulfur (S), wherein each of the cylindrical bodies has a geometry with at least one dimension that is in the nanoscale, and said each cluster of cylindrical bodies may have a width dimension ranging from 0.2 microns to 5.0 microns, and a length greater than 5.0 microns.

\* \* \* \* \*